(12) United States Patent
Zauderer

(10) Patent No.: US 7,553,463 B2
(45) Date of Patent: Jun. 30, 2009

(54) TECHNICAL AND ECONOMIC OPTIMIZATION OF COMBUSTION, NITROGEN OXIDES, SULFUR DIOXIDE, MERCURY, CARBON DIOXIDE, COAL ASH AND SLAG AND COAL SLURRY USE IN COAL FIRED FURNACES/BOILERS

(76) Inventor: Bert Zauderer, 275 N. Highland Ave., Merion Station, PA (US) 19066

( * ) Notice: Subject to any disclaimer, the term of this patent is extended or adjusted under 35 U.S.C. 154(b) by 0 days.

(21) Appl. No.: 11/966,321

(22) Filed: Dec. 28, 2007

(65) Prior Publication Data

US 2008/0213146 A1 Sep. 4, 2008

Related U.S. Application Data

(60) Provisional application No. 60/883,683, filed on Jan. 5, 2007.

(51) Int. Cl.
| | |
|---|---|
| B01D 53/50 | (2006.01) |
| B01D 53/56 | (2006.01) |
| B01D 53/62 | (2006.01) |
| B01D 53/64 | (2006.01) |
| B01D 53/74 | (2006.01) |
| F23B 90/00 | (2006.01) |
| F23B 99/00 | (2006.01) |
| F23J 1/00 | (2006.01) |

(52) U.S. Cl. ............... 423/210; 423/230; 423/235; 423/244.01; 110/203; 110/218; 110/255; 110/266; 110/341; 110/342; 110/345; 431/2

(58) Field of Classification Search ............ 110/203, 110/218, 255, 266, 341, 342, 343, 345; 423/210, 423/230, 235, 244.01; 431/2; 518/705, 728
See application file for complete search history.

(56) References Cited

U.S. PATENT DOCUMENTS

| | | | | | |
|---|---|---|---|---|---|
| 3,004,836 | A | * | 10/1961 | Thompson | 110/342 |
| 4,052,173 | A | * | 10/1977 | Schulz | 48/202 |
| 4,057,293 | A | * | 11/1977 | Garrett | 299/2 |
| 4,190,421 | A | * | 2/1980 | Hwa | 44/641 |
| 4,664,042 | A | * | 5/1987 | Nelson | 110/347 |
| 4,927,430 | A | * | 5/1990 | Calderon | 48/197 R |
| 5,171,406 | A | * | 12/1992 | Shang et al. | 201/31 |
| 6,048,510 | A | | 4/2000 | Zauderer | |
| 6,722,295 | B2 | | 4/2004 | Zauderer | |
| 2007/0119351 | A1 | * | 5/2007 | Widmer et al. | 110/342 |
| 2007/0119352 | A1 | * | 5/2007 | Martin et al. | 110/347 |
| 2007/0180835 | A1 | | 8/2007 | Zauderer | |
| 2008/0105175 | A1 | * | 5/2008 | Booth et al. | 110/185 |

* cited by examiner

*Primary Examiner*—Timothy C Vanoy
(74) *Attorney, Agent, or Firm*—Greenblum & Bernstein, P.L.C.

(57) ABSTRACT

Methods by which new or used boilers or furnaces ranging from small industrial to the largest utility units that are designed for coal or oil or natural gas or shredded waste or shredded biomass firing can substantially improve their technical operation and sharply reduce their capital and operating costs by implementing component modifications and process steps that (a) minimize the adverse impacts of coal ash and slag on boiler surfaces and particulate emissions thereby also facilitating the use of oil or gas designed boilers for coal firing, (b) drastically reduce the loss of water used to transport coal in slurry form to power plants, (c) essentially eliminate the combined total nitrogen oxides ($NO_x$), sulfur dioxide ($SO_2$), mercury (Hg), trace metals, and carbon dioxide ($CO_2$) emissions, (d) separate and permanently sequester carbon dioxide released during combustion and (e) improve the coal and solid fuel combustion efficiency.

29 Claims, 9 Drawing Sheets

FIGURE 1: 50 MW Power Plant-Annual Emissions
SO2 Up & NOx Down after 1998 shift to low NOx burners
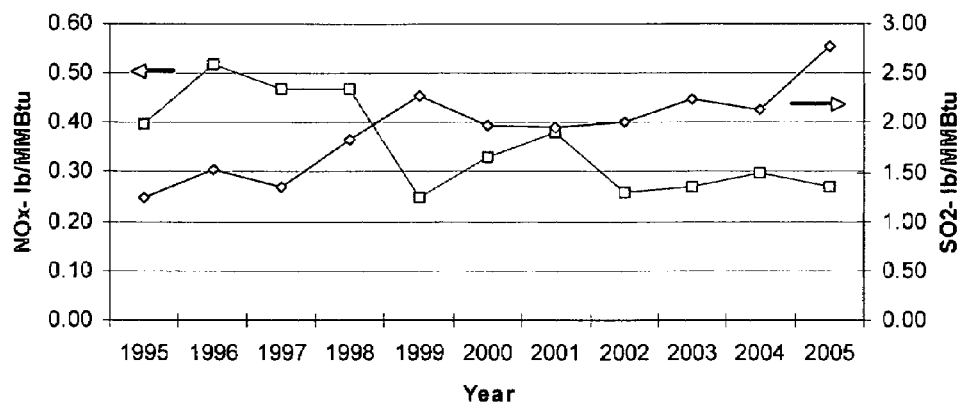
FIGURE 2: 50 MW Coal Power Plant-
Percentage Change in Annual SO2 & NOx Emissions
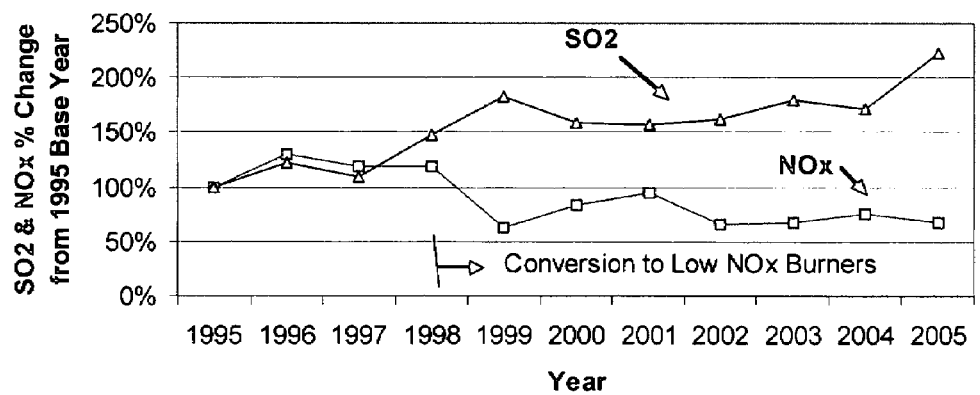

FIGURE 3: 50 MW Coal Power Plant-
SO2 (12 month) & NOx (5 month summer Ozone)
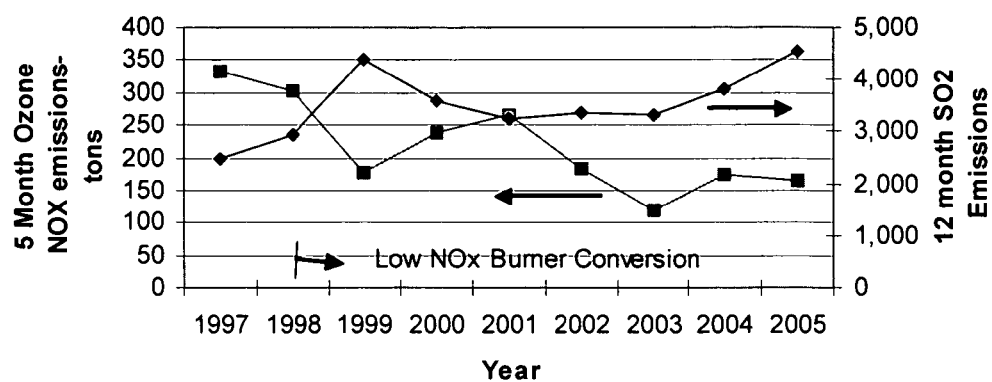
FIGURE 4: FOUR 40 MW COAL POWER PLANT BOILERS
SO2 Increases as NOx Decreases below 0/5 lb/MMBtu
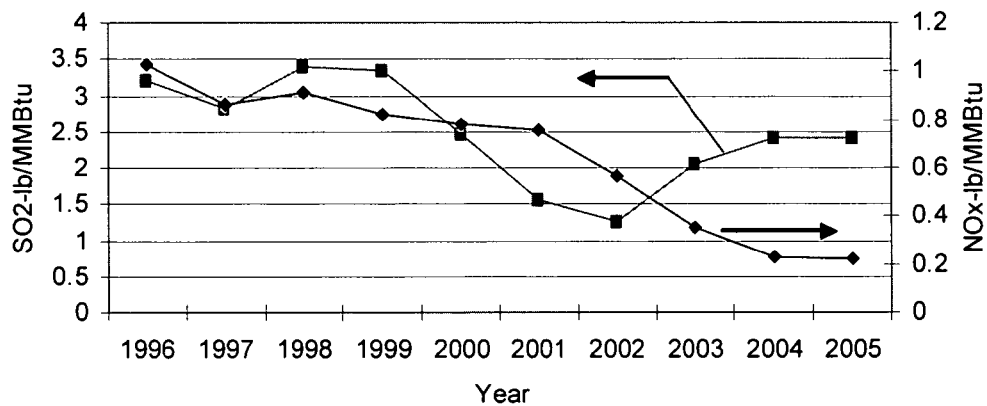

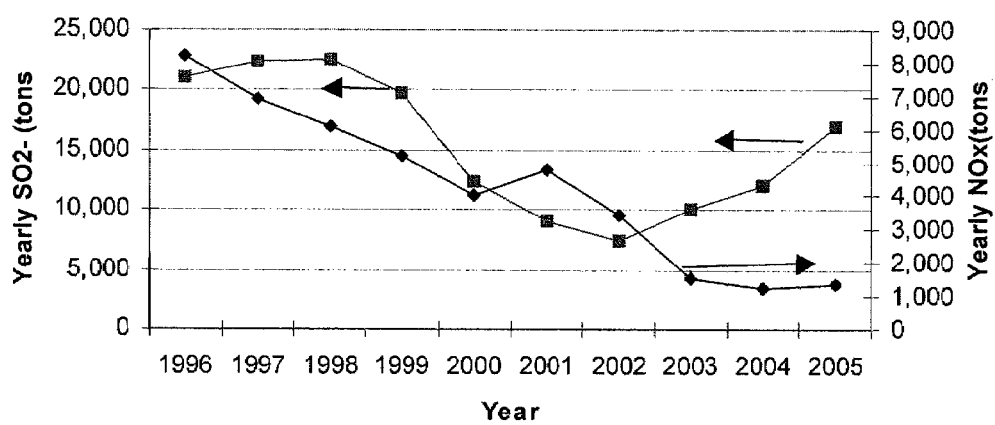
FIGURE 5: SO2 & NOx in Four 40 MW Power Boilers

FIGURE 6: Fuel Tech vs 50 MW Coal Plant- SNCR NOx Results
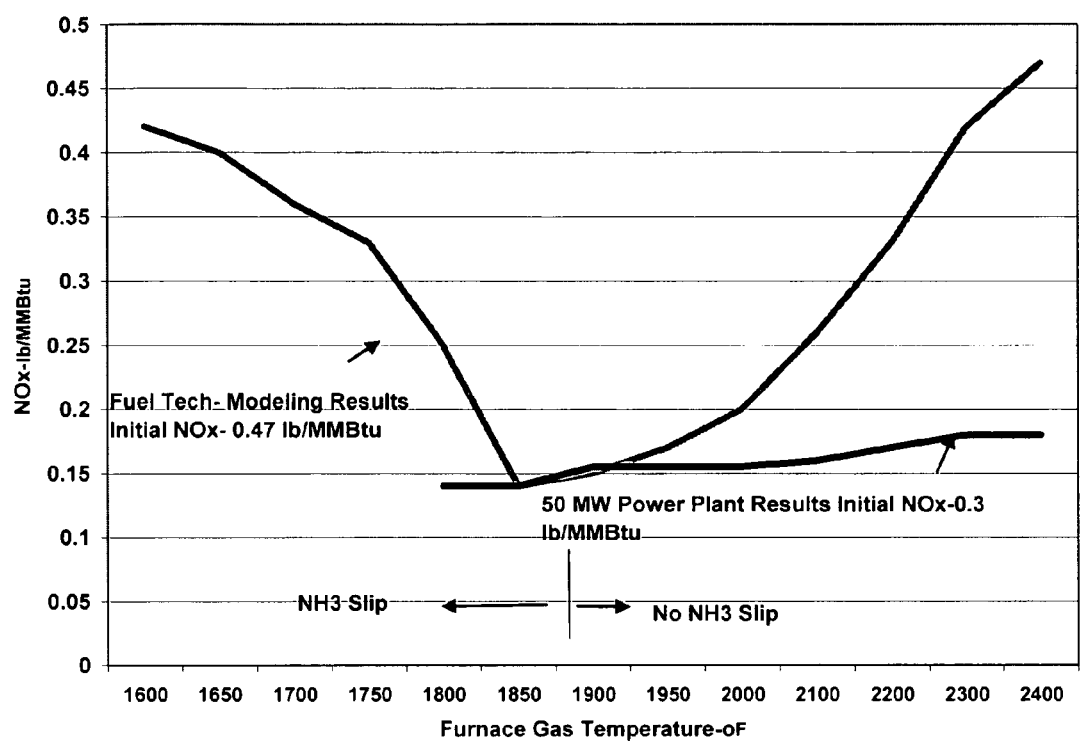

FIGURE 8: US Power Plant SO2 & NOx Emissions
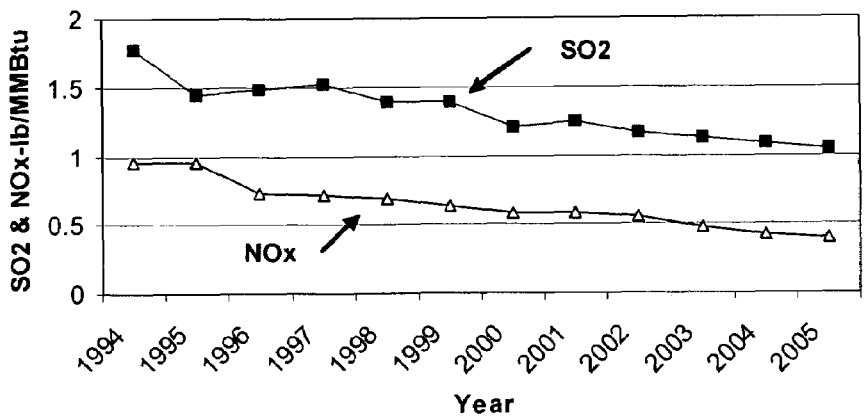
FIGURE 9: 550 MW Cell Burner Boiler-SO2 & NOx
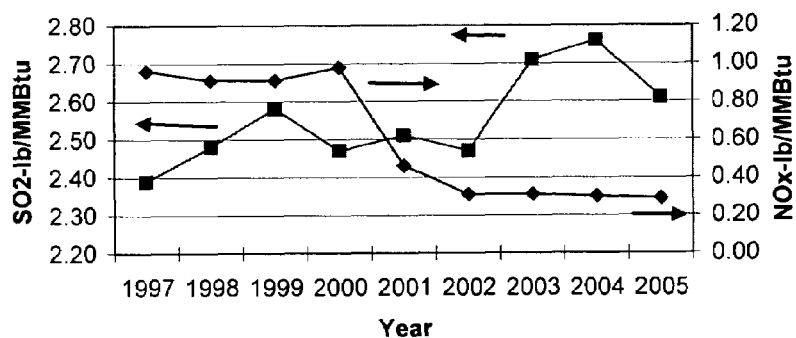
FIGURE 10: 550 MW Cell Burner- NOx & SO Flow
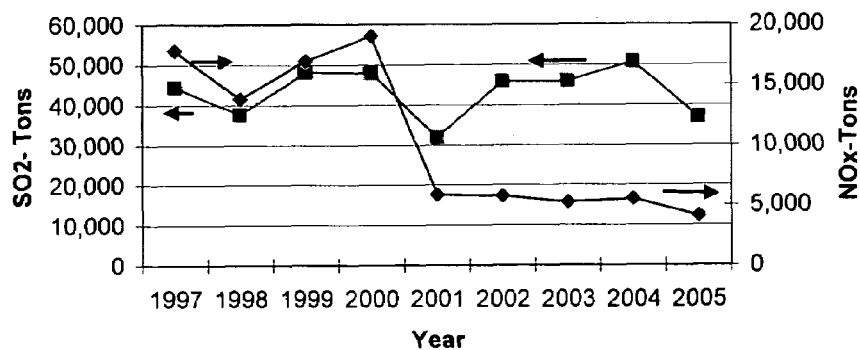

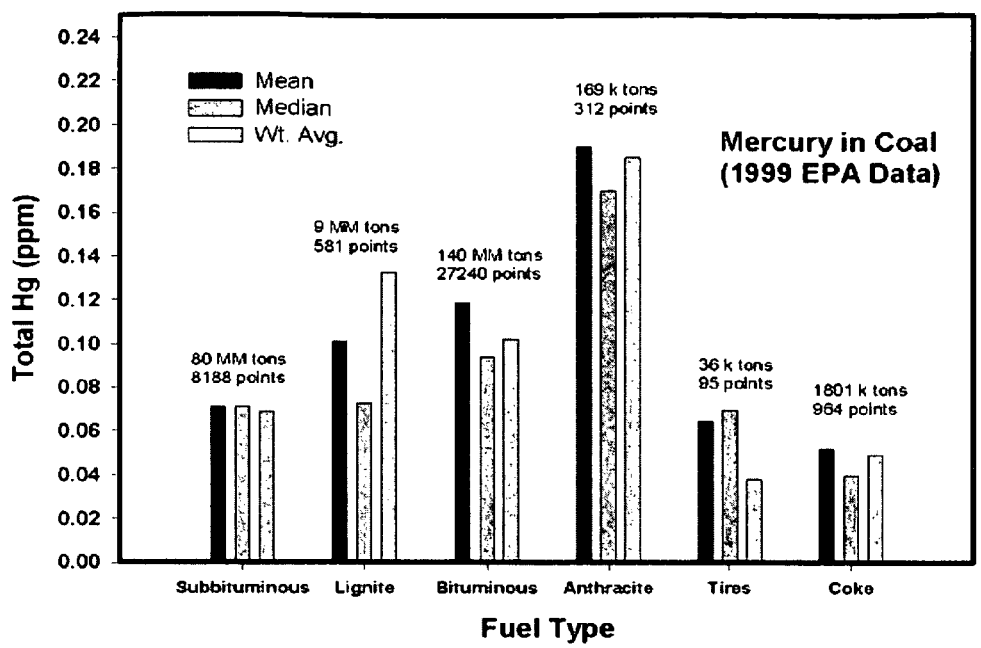
Figure 13: Average Mercury Content in U.S. Coals
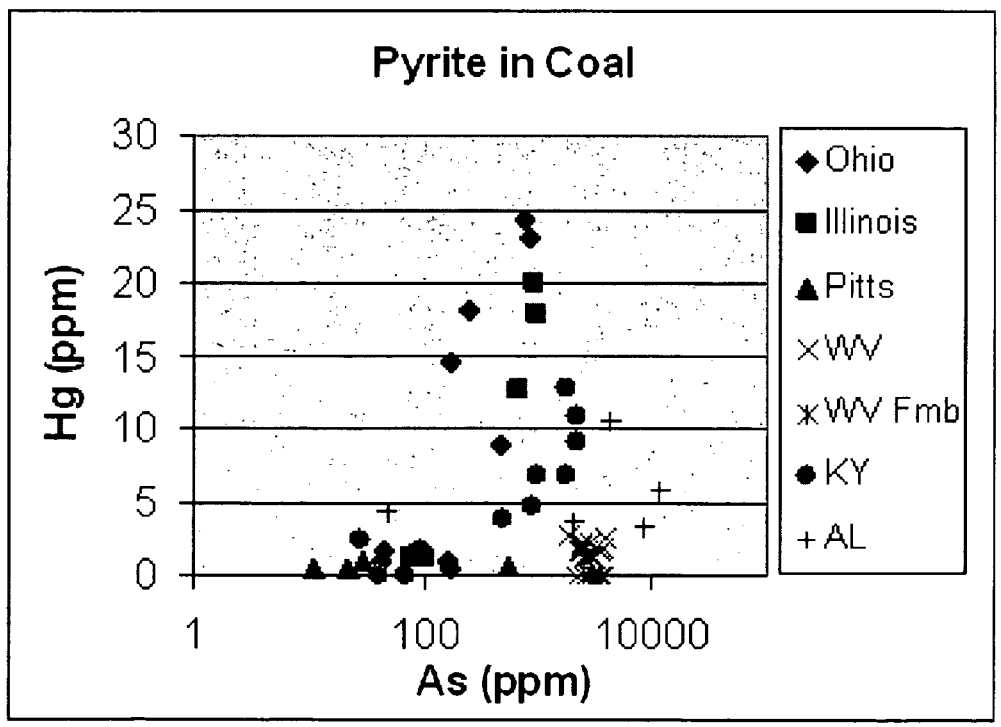
Figure 14: In bituminous coals the mercury is concentrated in the ash pyrites

TECHNICAL AND ECONOMIC OPTIMIZATION OF COMBUSTION, NITROGEN OXIDES, SULFUR DIOXIDE, MERCURY, CARBON DIOXIDE, COAL ASH AND SLAG AND COAL SLURRY USE IN COAL FIRED FURNACES/BOILERS

CROSS REFERENCE TO RELATED APPLICATIONS

This application claims priority under 35 U.S.C. 119 to provisional application Ser. No. 60/883,683, filed on Jan. 5, 2007, the contents of which are incorporated in their entirety herein.

FIELD OF THE INVENTION

The present invention generally relates to improvements in methods by which new or used coal fired boilers whether designed for coal or oil or natural gas firing can substantially improve their technical operation and reduce their capital and operating costs by implementing process steps that (a) minimize the adverse impacts of coal ash and slag on boiler surfaces and particulate emissions, which will improve coal combustion efficiency and facilitate the use of oil or gas designed boilers for coal firing, (b) drastically reduce the loss of water used to transport coal in slurry form to power plants, (c) minimize the combined total nitrogen oxides ($NO_x$), sulfur dioxide ($SO_2$), mercury (Hg), and carbon dioxide ($CO_2$) emissions, and (d) improve the coal and solid fuel combustion efficiency.

DISCUSSION

The present invention evolved primarily from the inventor's testing and analyses subsequent to the initial filing of his two inventions (Zauderer: U.S. Pat. Nos. 6,048,510, Dated: Apr. 11, 2000, and 6,722,295 B2, Dated: Apr. 20, 2004), which by reference are fully incorporated herein in their entireties. This testing occurred partly in the 20 MMBtu per hour, coal-combustor-package boiler installation described as FIG. 1 in the subject patents. The most significant testing that led to the present invention occurred in the 50-megawatt coal fired power plant in the two-year period from November 2003 through November 2005. FIG. 3 in said two patents is a schematic drawing showing how said inventions are practiced in utility boilers, such as in the 50 MW-power plant. This power plant was also utilized in the development of the present invention.

In addition, Bert Zauderer filed three provisional U.S. Applications. No. 60/765,716, filed Feb. 7, 2006, No. 60/786, 372, filed Mar. 28, 2006, and No. 60/744,294, filed Apr. 5, 2006, which disclose further improvements in the utilization of processes that reduce $NO_x$ and $SO_2$ emissions from coal fired boilers, which by reference are fully incorporated herein by reference in their entireties. Said provisional applications were incorporated in their entireties in non-provisional Publication No. 20070180835, Ser. No. 11/668,929, filed Jan. 30, 2007, which is incorporated by reference herein in its entireties.

In addition, another art concerns the ash and slag properties that were uncovered in the international magnetohydrodynamic power generation program of the 1970's. This work is summarized in the review book, "Open Cycle Magnetohydrodynamic Electrical Power Generation", Edited by M. Petrick (USA) and B. Y. A. Shumyatsky (USSR) (Argonne National Laboratory, Argonne II, 1978). This work represented an advance from art that was developed in previous decades of the early and middle 20th Century in the steel industry on the properties of mixtures of metal oxides in liquid states. Others are currently marketing ash and slag conditioning processes for coal ash and slag in coal fired boilers in the US and overseas. However, the details of these processes are not disclosed even in US patent filings and from the details provided there is no teaching on how to apply these conditioning processes to the wide range of conditions one encounters in the combustion of coals with widely varying properties.

Another source of public information of emissions from coal combustion is the US Environmental Protection Agency (EPA), which publishes very extensive data on output and emissions of all US power plants on a daily, monthly quarterly, annual and seasonal basis. At present all this detailed information is provided by dates from 1995 when EPA began to report $SO_2$ and $NO_x$ emissions ranging from hourly, daily, monthly, quarterly, the 5 month summer ozone season, and annually. The Ozone Season requires curtailed $NO_x$ emission in the 5 months from May 1 to September 30 each year. As a result the emissions from $NO_x$ were curtailed primarily by introduction of low $NO_x$ burners. On the other hand, $SO_2$ emission reduction rules were not tightened in the mid 1990s and as a result, emission-trading prices for $SO_2$ remained in the $200 per ton range, while $NO_x$ credits sold in the $600 per ton range, except for a brief several months long spike to about $6,000 to $7,000 per ton in the late 1990s. In 2003 EPA introduced more stringent $NO_x$ emission standards. The new ceiling on $NO_x$ emissions became 0.15 lb/MMBtu. As a result, the price of $NO_x$ emission spiked to $6,000 per ton in 2003, and it remained in the $2000 to $3000/per ton range until 2006, when it decreased to present levels of under $1000 per ton in the fall of 2006. Also, $SO_2$ emission credits had remained at less than $200/ton for years, in part due to the massive shift that began in the 1990s to low sulfur coal in the East and much greater use of low sulfur Western coal shipped to the Mid-West. However, a few years ago, $SO_2$ credits began to increase to the $600 to $700 per ton range in 2004. By late 2005, the price of $SO_2$ spiked to $1,600 per ton. However, in 2006, the price dropped sharply and by the fall of 2006 it was in the $500 per ton range, which is still 2½ times higher than in earlier years. These high price fluctuations may very well have been a result of the anticipation of more stringent emissions controls in 2009, when emission credit prices may very well increase.

One solution to the financial risk of high capital cost emission control technology is low capital cost $NO_x$ and $SO_2$ control processes, which can be practiced with Zauderer's $NO_x$ and $SO_2$ patents and provisional applications and non-provisional applications. The equipment cost is minimal and almost the entire cost is in consumable reagents. Therefore, these emission control processes enable coal-fired power plants to operate economically even if these control methods are used only for a few hours daily.

U.S. Pat. No. 6,048,510 and U.S. Pat. No. 6,722,295 were utilized in practicing said patents. The first patent discloses methods to reduce $NO_x$ in the post-combustion zone of coal fired utility boilers by injecting droplets of varying size, consisting of urea dissolved in water, at the outer edge of a gas zone and dispersing them throughout said gas zone where the gas temperatures are in the range of 1700° F. to 2100° F. that is conducive to $NO_x$ reduction. The second patent discloses a method of using the same equipment as in the first patent and adding to the water-urea solution, very fine lime or limestone particles that are dispersed in said droplets for the purpose of simultaneously reducing both $NO_x$ and $SO_2$.

The research and development that led to said $NO_x$ and $SO_2$ patents was implemented primarily during testing in the post-combustion zone of a 20 MMBtu/hour coal combustor-package boiler facility shown schematically in FIG. 1 in each of said two patents, as described in detail in said patents. The patents summarize test results in said boiler in which peak $SO_2$ reductions in the 80% range were obtained by injection of droplets containing lime or finely ground limestone particles dispersed in water. Also, $NO_x$ reductions of up to 80% were measured in said boiler with droplets of ammonia-water solutions and somewhat lesser amounts with urea-water solutions.

The three subject Provisional Applications by Zauderer deal with the results obtained in very extensive SNCR $NO_x$ tests with said Zauderer's patented inventions. Tests in a 50 MW coal fired boiler were conducted in the 4 months from June to the end of September 2005, as well as short duration tests for $NO_x$ and $SO_2$ in the 50 MW boiler in prior years and in 2005 and 2006. The results were reported in the cited subject Provisional Applications.

One other element that differentiated Zauderer's SNCR process from other art such as that practiced by Fuel Tech Corp. of Illinois is that their process is limited to combustion gas temperatures in the urea or ammonia injection zone of the boiler's furnace of less than 1900° F, while Zauderer's process is effective even as high as 2400° F. under excess air conditions and even higher under local fuel rich conditions because the local gas temperature is cooled to the gas temperature at which the SNCR reaction is effective, as disclosed in said Zauderer's patents and Provisional Applications. Furthermore, as will be discussed in the next Section, Fuel Tech recently disclosed the need for an additional modified Selective Catalytic Reduction (SCR) process to achieve high $NO_x$ reductions. This greatly increases Fuel Tech's process equipment cost by at least 5 times for their SNCR process over Zauderer SNCR process, and an undetermined but certainly much greater cost when combined with their modified SCR process.

SUMMARY OF THE INVENTION

One solution to the financial risk of high capital cost emission control technology is low capital cost $NO_x$ and $SO_2$ control processes, which can be practiced with Zauderer's $NO_x$ and $SO_2$ patents and provisional applications and non-provisional applications. The equipment cost is minimal and almost the entire cost is in consumable reagents. Therefore, these emission control processes enable coal-fired power plants to operate economically even if these control methods are used only for a few hours daily. The present invention teaches by example how this low capital cost was practiced in a 50 MW coal fired power plant.

The invention includes:

(A) For medium (about 10%) to high (10% to 50%) ash coals, air-cooled slagging combustors are used to convert the coal ash to slag with or without co-firing with mineral additives, depending on the ash chemical composition, and retaining about 75% of the slag in the slagging coal combustors.

(B) For low ash (about 1%) to medium (about 10%) ash coals mineral additives are co-fired with the coal to increase the ash fluid temperatures and inhibit ash to slag conversion. Alternatively or jointly with the ash conditioning the combustion gas temperatures in the primary combustion zone or immediately downstream of said zone are reduced to inhibit slag formation.

(C) In power plants whose coal is delivered as a coal-water slurry from a distant coal mine, combustors such as the air cooled cyclone combustor are used to achieve efficient combustion of the delivered slurry followed by cooling in the boiler's exhaust ducts of the moisture laden combustion gases to about 150° F. at which point about 75% of the water will condense allowing recovery of about 75% of the slurry water, and on condition that said combustion gases are first neutralized to prevent sulfuric acid condensation on exhaust duct surfaces.

(D) The vast majority of coal fired boilers use "low $NO_x$" burners, which involve fuel rich combustion, to reduce $NO_x$ emissions. However, the resultant deficiency of oxygen greatly reduces the combustion efficiency of solid coal particles due to their very low reactions rates with the carbon dioxide and water molecules in the fuel rich combustion gases. This results in significant unburned carbon in the ash in the exhaust gases. To maintain acceptable combustion efficiencies with minimum unburned carbon, some power plants are fired with high volatile bituminous or sub-bituminous coals, whose higher easily gasified composition improves combustion efficiency. Unfortunately, many of the high volatile coals have high sulfur levels thereby increasing $SO_2$ emissions. The present invention discloses that the primary coal burners should operate under minimal to no fuel rich conditions, which will increase $NO_x$ emissions substantially above those attained with "low $NO_x$" coal burners. Then utilize Zauderer's patented Selective Non-Catalytic Reduction (SNCR) $NO_x$ process (U.S. Pat. No. 6,048,510), with or without reburn using preferably biomass as the reburn fuel (No. 6,453,830) to reduce $NO_x$ to the prior level achieved with "low $NO_x$" burners or below that level. This will enable the use of low volatile, low sulfur coals or even very low sulfur, very low cost, coal mine waste coal and result in greater combined $NO_x$ and $SO_2$ reductions. Due to the use of low sulfur coal, the amount of $SO_2$ reducing limestone or lime or other reducing agents, such as sodium compounds, will also be reduced. This is of special benefit in the use of coal in oil or gas design boilers because convective tube blocking by ash particulates are also reduced. An additional benefit from this invention is that not only is the amount of limestone or lime or other $SO_2$ reducing agents needed greatly reduced, but also the very porous calcined particles can react to remove atomic and molecular trace metals, especially mercury and arsenic.

As an additional benefit, the excess limestone not used for $SO_2$ reductions that is captured in stack gas particulate removal equipment can be combined with pressurized $CO_2$ and water to form emulsions or liquid mixtures that convert the limestone to calcium bicarbonate and permanently sequester the $CO_2$ deep underground and/or the Oceans. Therefore, use of this invention will greatly reduce the combined $NO_x$, $SO_2$, $CO_2$, Hg, As, and other trace compounds leading to zero emissions from coal in the US and the World.

The present invention can also be practiced on new boiler installation because its capital costs are substantially lower than existing control systems for said pollutants. However, its primary immediate benefit is that it offers a low capital cost solution to many existing domestic and overseas power plants whose size and age precludes economic retrofit with the very high capital cost $NO_x$ reduction processes of Selective Catalytic Reduction (SCR) and the very high capital cost $SO_2$ reduction processes, wet or dry Flue Gas Desulfurization (FGD).

A method whereby slag formed from solid fuel ashes during combustion in boilers or furnaces is suppressed by introducing additional air in a post-primary combustion zone to lower the combustion gas temperatures below temperatures at which the ash softens or liquefies and adheres to boiler or furnace surfaces.

The slag formation is also suppressed with metal oxides particles, including at least one of calcium, magnesium, iron, chrome oxides, that are injected in dry or slurry form, and in quantities that increase fuel ash softening and melting temperatures above the gas temperatures wherein the ash particles are entrained. The metal oxides also control gas emissions, including at least one of $NO_x$, $SO_2$, $CO_2$, and trace metals including at least one of arsenic, lead and mercury. A selection of the metal oxides is determined from temperature and composition phase diagrams based on combined chemical compositions of metal oxide additives and the fuel ash.

Another method to suppress the deposition and adhesion of ash or slag particles on a boiler or furnace is by injecting quantities of metal oxides that are a small fraction of quantities required to impact chemical properties of fuel ash but sufficient to deposit on fuel ash particles' surfaces thereby rendering the fuel ash friable and sharply reducing or even eliminating ash or slag deposition on furnace or boiler surfaces.

A method for use in high ash coals, greater than 10%, is introducing fluxing agents including limestone are used in air-cooled, slagging combustors to remove up to about 80% of coal ash as liquid slag, while a balance of ash exiting a combustor is treated as in the preceding paragraph to suppress ash deposition on the boiler or furnace to which the combustor is attached. This latter method is also for use in coals with about 5% of less ash, in a conventional pulverized coal burner attached to oil or gas design boilers and furnaces.

A method for using a coal fired power plant fueled by a coal-water slurry pipeline, wherein an air-cooled slagging combustor replaces coal burners to achieve efficient combustion, and exhaust combustion gases are cooled with water droplets sprays to about 150° F. in order to condense and recover a bulk of the slurry water.

A process wherein volatile matter evolved by pyrolysis of coal is converted to high Btu gas by methanation or to liquid fuel with Fischer Tropsch synthesis.

A method of achieving the same final level of reduction of nitrogen oxides, ($NO_x$), at an exhaust stack by low-$NO_x$ burners in a primary combustion zone of coal fired boilers or furnaces followed in a post-combustion zone with final combustion air and followed by Selective Catalytic Reduction (SCR) is accomplished by minimizing a degree of $NO_x$ reduction due to low $NO_x$ burners and final combustion air, reducing a resultant increased $NO_x$ emissions in the post combustion zone by a Selective Non-Catalytic Reduction (SNCR) process that has no adversely impacting ammonia slip, and adding reburn with biomass, which will duplicate $NO_x$ emissions achievable with SCR.

Any additional $NO_x$ emission is accomplished by purchase of $NO_x$ emission allowances.

The SNCR process comprises inserting multiple flat plane air atomized droplets of aqueous solutions of urea or ammonia droplets at an edge of an entire boiler or furnace post-combustion gas cross-section wherein the $NO_x$ reducing reaction is effective. Diluting water flow for urea or ammonia is increased as needed to lower combustion gas temperature to a range at which $NO_x$ reduction is optimum, between 1800° F. and 2000° F., and wherein power lost by the gas cooling is replaced by increasing coal flow.

The degree of $NO_x$ reduction by low $NO_x$ burners is reduced to enable firing of low volatile, low sulfur coals to reduce sulfur dioxide emissions, $SO_2$, without any significant loss of unburned carbon in boiler or furnace exhaust.

Mass flow of biomass utilized for reburn is increased to reduce non-renewable flow of carbon dioxide, $CO_2$, exiting to atmosphere by about 15% or more from levels achieved with 100% coal combustion.

These methods of operating coal fired boilers and furnaces minimize emission and minimize capital and operating costs.

Another method whereby coals, primarily bituminous coals, that have most or all of their mercury concentrated in pyrites in concentration related to arsenic content in the pyrites, is to have the mercury removed by utilizing air-cooled slagging combustors and impacting the mercury containing coal slag particles in a slag layer lining a wall of a combustor and removing and water quenching the slag from the combustor before the mercury revolves into combustion gases.

A method suitable for all coals in controlling slag and ash depositions on refractory and metal walls exposed to ash and slag laden coal combustion deposition by co-injecting with coal in a primary combustion zone or in an immediate post-combustion zone metal oxides in concentration of less than 1% of total coal feed for attaching to a surface of coal ash or slag particles, thereby inhibiting adherence to each other and to the metal walls.

The metal oxide additives are selected from phase diagrams of coal ash injected metal mixture, which have liquefaction temperatures that are higher than liquefaction temperatures of the coal ash. The metal oxides particles in a 10 micron range are dispersed in air atomized, aqueous droplets of varying diameters throughout combustion gases in the primary combustion zone and post-combustion at gas temperatures above about 2000° F.

A method whereby lime particles, nominal of about 10 microns in diameter are dispersed in water at concentrations up to 30% by weight and injected as air atomized droplets to intercept post-combustion gas flow in a temperature range of 1800° F. to 2400° F., utilizing injectors with sufficient capacities to disperse aqueous lime mixture at up to a mol ratio of calcium oxide to sulfur dioxide of three (3), and sufficient water flow capacity to cool a combustion zone being treated to gas temperatures at which $CaO$—$SO_2$ capture reaction is maximum, being about 1800° F., with additional coal being fed through primary burners to recover energy lost in cooling the combustion gases to said temperature range.

The limestone of essentially identical particle size replaces lime, and a concentration of the limestone is increased by use of stabilizers and surfactants to increase the limestone concentration in water to up to nominally 50%.

If lime or limestone is used for $SO_2$ reduction, excess lime or limestone recovered in particulate collection systems of a boiler or furnace is to be used to form emulsions comprising liquid carbon dioxide, water and the limestone which form calcium bi-carbonate for sequestration underground or in Oceans at depth sufficient to prevent release of carbon dioxide as gas. The emulsion is augmented with finely pulverized limestone to further increase a quantity of carbon dioxide reacted to form the calcium bi-carbonate. The air-cooled slagging combustors are utilized in primary coal combustors for boilers or furnaces to remove about 75% of coal ash as slag and thereby increase a ratio of the limestone to coal ash or, if necessary, in order to simplify removal of the coal ash prior to preparation of the water-carbon dioxide-limestone emulsion.

The $CaO$—$SO_2$ reaction implemented at a calcium to sulfur mol ratio of up to three replaces flue gas desulfurization processes.

The emulsion preparation method is utilized to augment removal and sequestration of $CO_2$ by compression of nitrogen-carbon exhaust gases followed by dispersal in water and removal of the compressed nitrogen by expansion in a gas turbine and pumping high pressure carbon dioxide-water solution into underground limestone formations to form calcium bi-carbonate.

The lime or limestone used for $SO_2$ capture is calcined to highly porous calcium oxide particles, and the excess particles not reacted with $SO_2$, react with atomic and molecular mercury and other trace metal including arsenic for removal from the combustion gases in cooler downstream sections of a boiler or furnace.

BRIEF DESCRIPTION OF THE DRAWINGS

The present invention is described in the detailed description, which follows, in reference to the noted plurality of drawings by way of non-limiting examples of exemplary embodiments of the present invention.

FIG. 1 is a graph showing the annual emissions of $SO_2$ and $NO_x$ in pounds per million Btu in a 50 MW coal fired power plant boiler from 1995 to 2005;

FIG. 2 is a graph showing the annual percent change $SO_2$ and $NO_x$ emissions in a 50 MW coal fired power plant boiler from a 1995 base of 100% to 2005;

FIG. 3 is a graph showing the annual emissions of $SO_2$ and 5-month summer ozone season of $NO_x$ in tons in a 50 MW coal fired power plant boiler from 1997 to 2005;

FIG. 4 is a graph showing the annual emissions of $SO_2$ and $NO_x$ in pounds per million Btu in four 40 MW coal fired power boilers from 1996 to 2005;

FIG. 5 is a graph showing the annual emissions of $SO_2$ and $NO_x$ in tons in four 40 MW coal fired power plant boilers from 1996 to 2005;

FIG. 6 is a graph comparing the $NO_x$ emissions with the Fuel Tech SNCR Process with the results obtained by practicing Zauderer's SNCR process on a 50 MW coal fired boiler;

FIG. 8 is a graph showing the annual emissions of $SO_2$ and $NO_x$ in pounds per million Btu for all U.S. coal fired boilers from 1994 to 2005;

FIG. 9 is a graph showing the annual emissions of $SO_2$ and $NO_x$ in pounds per million Btu in a 550 MW cell burner coal fired power boilers from 1997 to 2005;

FIG. 10 is a graph showing the annual emissions of $SO_2$ and $NO_x$ in tons in a 550 MW cell burner coal fired power plant boiler from 1997 to 2005;

FIG. 13 is a graph showing the mercury concentration in the six U.S. coal groups in ppm (source: U.S. environmental protection agency, unified air toxics program: electric utility steam generating units hazardous air pollutant emission study, 2000, http://www.epa.gov/ttn/atw/combust/utiltox/utoxpg.html#da3); and FIG. 14 is a graph showing the relation between mercury content in ppm to the arsenic content in ppm in US coal ash pyrites (source" u.s. geologic survey. http://energy.er.usgs-.gov/health_environment/mercury/mercury_coal.html)

DETAILED DESCRIPTION OF EMBODIMENTS OF THE INVENTION

Figure 7:
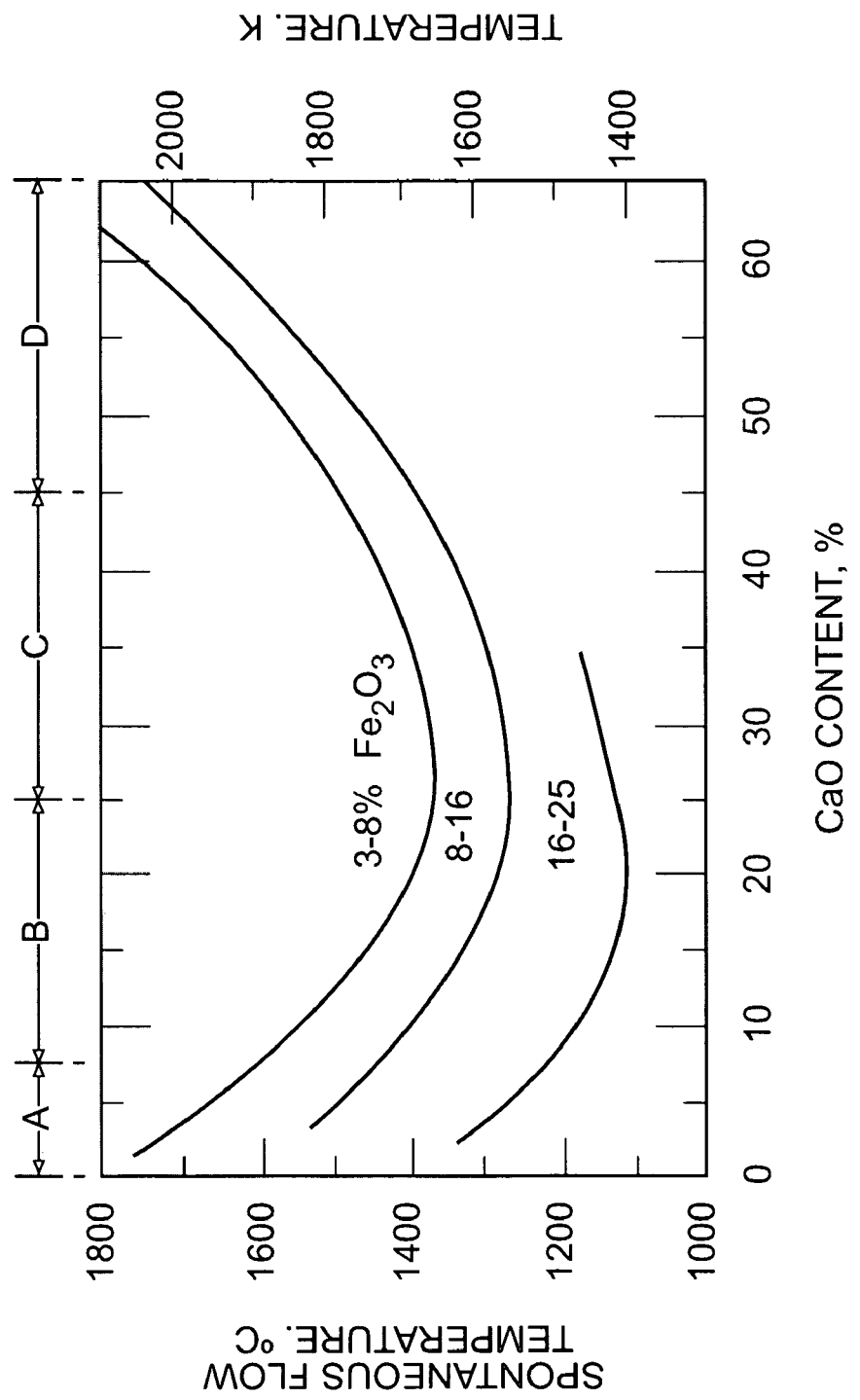
FIG. 7 is a graph of the dependence of slag flow temperature on CaO and $Fe_2O_3$ content in (a) highly acidic, (b) acidic, (c) basic, (d) highly basic slags.

At present the preferred commercial option for new or existing coal fired power plants is to add $SO_2$ Flue Gas Desulfurization (FGD) stack scrubbers and $NO_x$ Selective Catalytic Reduction (SCR) systems that can meet the current stringent standards. While activity in this area has increased, it is not a cost effective solution to many coal fired power plants because the high capital cost of SCR and FGD carries the risk of adding long-term fixed costs to old power plants, which would make these plants unprofitable if electricity prices or electricity use were to decline, or coal prices or environmental regulations increase during the amortized life of this pollution control equipment.

The present disclosure includes a number innovations and applications to address this.

1) Use of SNCR $NO_x$ Control to Reduce $SO_2$ Emissions and Reduce Unburned Carbon Combustion Loss The SNCR $NO_x$ reduction tests on the 50 MW boiler that were disclosed in the three subject Provisional Applications were conducted at initial $NO_x$ emission levels of 0.25 to 0.3 lb/MMBtu and at output power levels from 20 MW to full power output of 40 to 50 MW. As reported in said Provisional Applications, the $NO_x$ reductions ranged from 35% to 44% with droplet injection of dilute urea-water solutions of less than 5% of urea at concentrations of about 2 lb of urea per lb of $NO_x$ removed.

A very significant result that was disclosed in the Provisional Applications was the observation that the effectiveness of $NO_x$ reduction was dependent not on the average gas temperature at the plane of droplet injection but at the local gas temperature at which the urea-$NO_x$ reaction with the vaporized droplets occurred. Normally, the urea-$NO_x$ reaction reverses to form more $NO_x$ as the combustion gas temperatures exceeds 2100° F. However, in all the numerous tests that were conducted at various power output levels by this inventor in the 50 MW boiler, it was observed that increasing the water flow rate per injector as the combustion temperature increased above the 2100° F. SNCR reaction rate ceiling, was effective at all power levels in achieving the same $NO_x$ reductions as at gas temperatures below 2100° F. This is a major advantage of the present invention because in most large boilers the gas temperatures at which the SNCR reaction is effective occurs in the confined gas passages in the superheater tube sections. Here the inter tube space is small, measured in inches, which impedes the distribution of the urea-water droplets throughout the gases because most droplets impact the superheater tubes. The present invention, on the other hand, is practiced by inserting the SCNR solution injectors in the unobstructed open combustion gas space upstream of the superheater where the gas temperatures at high load is generally above the SNCR reaction ceiling of about 2100° F.

Therefore, in practicing the present invention the water flow rate is increased as the power output level of the boiler is increased. Another factor is that the local gas temperature where the droplets are distributed in the combustion gases controls the SNCR reaction because they locally cool the gas to the temperature at which the SNCR reaction is effective. This feature was especially noticeable at full load at which the combustion gas temperature at the injection plane was measured at 2400° F., which is about 300° F. above the gas temperature where the SNCR reaction ceases to function under excess air conditions. However, it was observed that almost the same level of overall $NO_x$ reduction was achieved with 5 gpm of urea-water solution when injected through each of 3 lances that were inserted through ports in adjacent three walls of the boiler upstream of the superheater tube bank, for a total of 15 gpm, as with 5 injectors inserted on the 3 side walls also having a 5 gpm flow rate and in addition to two corner injectors inserted at a 45° angle with a 2.5 gpm for a total of 20 gpm. In other words, almost the same $NO_x$ reduction was achieved in both cases. On the other hand, if the 15 gpm was divided into 5 equal flows into the 5 injectors, with only 3 gpm per injector, then the $NO_x$ reduction was substantially lower. Now at 20 gpm the reduction of the average gas temperature across the entire boiler furnace cross-section was calculated at less than 200° F., which was not enough to lower the temperature to the range at which the SNCR reaction is effective. The fact that high $NO_x$ reductions were nevertheless observed at these liquid flow rates and gas temperatures demonstrates that that the SNCR reaction is controlled by the local gas cooling in the plane that is intersected by the droplet spray pattern. Therefore, this procedure of injecting droplets can be adjusted as desired by changing the liquid flow rate and by increasing or decreasing the number of injectors to achieve the desired $NO_x$ reduction in any size boiler and at gas temperatures higher than the upper limit of the SNCR reaction.

This injection feature may be implemented by inserting the injection nozzle heads into the edge of the gas temperature cross-section at which the SNCR reaction is effective without gas cooling or by gas cooling to this temperature by the droplets. This is a feature of the SNCR process disclosed in Zauderer's $NO_x$ control inventions. Others developers of the SNCR process, such as Fuel Tech Corporation, place the injector nozzle head in the inner wall of the boiler, where it is separated from the required SNCR gas temperature by a thick cooler gas layer. As a result injecting the droplets from the wall will dissipate part of the spray pattern uselessly at too low a gas temperature, and cool the combustion gases near the boiler's inner wall. This in turn results in undesirable ammonia slip being transported to the downstream sections of the boiler and exhaust ducting because the urea or ammonia-NOx reaction ceases to be effective below about 1750° F. to 1800° F.

This distinction between Zauderer's SNCR process and Fuel Tech's SNCR process is shown in FIG. 6 that was extracted from a report on Fuel Tech's Web site. It shows the $NO_x$ reductions that were obtained by the Fuel Tech SNCR process from an initial $NO_x$ concentration of 0.4 lb/MMBtu in the combustion gases. To achieve the EPA 2003 standard of 0.15 lb/MMBtu, according to Fuel Tech requires a combustion gas temperature at the urea or ammonia injection region of 1900° F. Higher temperatures result in increased $NO_x$ and lower gas temperatures result in rapidly increasing ammonia slip. The slip limits of 2 to 5 ppm are needed to prevent downstream problems with liquid sulfur oxide-ammonia formation that fouls air heater tubes, or contamination of the fly ash with ammonia, or emissions into the atmosphere of ammonia. This ammonia slip will also develop in the cooled gas region near the boiler's inner walls. In contrast, the line market "50 MW" in FIG. 6 shows the results obtained by this inventor in the 50 MW coal fired boiler as a function of gas temperature at the injection points. At gas temperatures from 1800° F. to 2400° F., $NO_x$ emissions of 0.15 to 0.18 lb/MMBtu were measured with urea-water injection from initial levels of 0.3 lb/MMBtu in the 50 MW boiler. Thus FIG. 6 discloses test data showing that Zauderer's SNCR process operates at higher gas temperatures by increasing the water concentration in the water-urea solution emerging from the injector heads to enable the droplets to cool the temperature to the range where the SNCR reaction is effective.

The above discussion on the art as disclosed in said Zauderer's $NO_x$ two patents and three provisional applications form part of the basis for the present invention. A disclosed item in the three provisional applications of 2006 is that fuel rich combustion in the primary coal burner zone may be reduced. Zauderer teaches that the resultant increase in $NO_x$ from reducing fuel rich combustion will then be reduced by using the SNCR process to bring $NO_x$ back to the original low $NO_x$ level or more likely below it. Another element in Zauderer's SNCR process is that to offset the higher gas temperature that results from coal combustion at slightly less or slightly above stoichiometric conditions, which increase thermal $NO_x$, is to inject additional air, steam or water in the combustion zone to lower the gas temperature sufficiently to reduce thermal $NO_x$. This added water and/or steam or air injection is small compared to the normal combustion air because in coal combustion thermal $NO_x$ is not the driving force in emissions. Instead it is the Fuel Bound $NO_x$ (FBN) in the coal that is released during combustion from the nitrogen in the coal that is the primary source of $NO_x$ in coal burners. Combustion under fuel rich, conditions suppresses the fuel bound $NO_x$ and coal combustors that operate fuel rich and are called "low NOx burners" are widely used in most coal fired boilers in the USA and abroad for this purpose.

2) Economic Benefit of Removing Low $NO_x$ Burners when Using High Ash Coal

An inherent problem with low $NO_x$ burners is that by reducing oxygen the combustion of solid coal carbon particles remaining after the volatile components in the coal are driven off requires the water-carbon and carbon dioxide-carbon reaction for combustion. Those rates are several orders of ten slower than the oxygen-solid carbon reaction. As a result a substantial concentration of unburned carbon particles remains and they are transported through the boiler furnace into the exhaust duct and to the particulate collections system, which is either an electrostatic precipitator (ESP) or fabric filter baghouse (FFB). Levels of unburned carbon even as low as about 5% of the ash limit the use of ash as a marketable product. This is a major impediment to the current major thrust by the U.S. Department of Energy ("Coal Utilization By Products" Topical Report No. 24, August 2006) and EPA to convert the over 100 million tons of coal ash produced from combustion of coal annually to useful products. In effect, the beneficial effect of low $NO_x$ burners is offset by loss of carbon fuel, and reduction in ash utilization due to carbon content. There are special cases such as the 50 MW coal power plant that found a buyer for their 15% carbon content ash, but this is a limited market.

However, carbon has an HHV of 14,100 Btu/lb. The 50 MW plant uses 29% ash coal for about one-half its coal fuel and a high volatile bituminous coal for the balance, yielding a combined HHV of about 10,500 Btu/lb. Assuming an average ash content of 20%, one computes that the 15% carbon in the ash has a value as a fuel that exceeds its value as a marketable ash with 15% carbon. The 50 MW power plant operated in 2005 at about 27.8% overall efficiency. At full load of 50 MW, the hourly energy loss from 15% unburned carbon is equal to about 2.0 MW, which equals 4% of total power of 50 MW. In contrast, the power loss from the gas cooling in this SNCR process due to the urea-water solution spray that lowered the $NO_x$ from 0.3 lb/MMBtu to 0.18 lb/MMBtu, was only 1.8 MW. This would have given a net gain of 0.2 MW if no unburned carbon had been lost. Therefore, the loss of unburned carbon, called Loss on Ignition (LOI) is substantial because at full power, revenue was about $100/MW-hr, and on hot days in the summer of 2005 it reached $400/MW-hr.

On an annual basis this 15% carbon LOI loss is quite significant. Using an average 20% ash content for the high ash coal and the low ash bituminous coal, and using the MMBtu input in 2005 of 3.263 million MMBtu yields 31,000 tons of ash, which contains about 4,700 tons of carbon (15% carbon in ash). The 50 MW Heat Rate of 12,300 Btu/kW-hr in 2005 yields 10,700 MW-hr. So at a $50/MW-hr electricity market price, the carbon's value as a fuel is $535,000 and at $100/ MW-hr its value is $1.07 million annually. This electricity production value of the ash works out to $17.3 per ton of ash to $34.5 per ton of ash.

This inventor has no information as to the value of 15% carbon ash at the 50 MW plant. However, according to said DOE "Ash Utilization By-Products" Report, ash with more than 6% carbon has no value. Also, typical slag with only a few percent of lime, (CaO), is valued at $4 to $6 per ton, so that at best even with less than 6% carbon, the most the above ash's value would be under $200,000.

In contrast, if the ash has at least 19% CaO it has cementing properties and its value can range from $10 to $60 per ton. Now implementing the present invention of removing the low $NO_x$ burners and operating near stoichiometric conditions would yield ash with no significant LOI. Furthermore, by adding Zauderer's lime injection process into the post-combustion zone of the boiler to reduce $SO_2$ (U.S. Pat. No. 6,722, 295) would increase the CaO in the fly ash and yield from the sale of 31,000 tons of ash from $310,000 to $1.9 million of added revenue. Furthermore, as is discussed below in connection with FIG. 1, stoichiometric operation will enable 100% operation on high ash, low sulfur coal, as was the case in 1995, with uncontrolled $SO_2$ of 1.25 lb/MMBtu. Using a conservative Ca/S ratio of 3 to reduce $SO_2$ by this patented process which Zauderer's numerous tests in his 20 MMBtu/hr combustor-boiler has used to reduce $SO_2$ by about 80%, would result in about 20% CaO in the fly ash of the 50 MW boiler. This will convert the ash to cement quality with market values in the range for $10/ton to $60/ton.

Therefore, when Zauderer's SNCR Process is used to reduce $NO_x$ to the 0.15 lb/MMBtu from uncontrolled $NO_x$ levels generated by combustion with low sulfur, low volatility coal, and with limestone/lime injection to remove the bulk of the $SO_2$ in the post-combustion zone and to condition the coal ash to cement quality properties, it will result in high efficiency combustion and minimal $SO_2$ and $NO_x$. In addition, Zauderer $CO_2$ removal processes disclosed in U.S. Pat. No. 7,282,189, issued Oct. 16, 2007, provides a suite of processes for the operation of efficient coal combustion with near zero emissions and useful ash waste products.

Due to some confusion on the economic aspects of cooling the combustion gas with water droplets in the SNCR injection zone, the following explains, using the 50 MW plant as an example, that there is only a minimal cost impact from cooling the combustion gas in the SNCR injection zone. The reason for this confusion is that the first impression is to focus on the loss of power output as the gas temperature is lowered by the gas cooling. However, the power loss from gas cooling by the water-urea solution is only a few percent of the power output, all of which can be recovered by increasing the coal flow to offset the reduced power from the injector spray. In fact this inventor recognized this coal flow increase when he was in the power plant control room at one time when urea injection began. In all previous cases when injection began, $NO_x$ would decrease within about 10 minutes after start of injection, but then $NO_x$ slowly began to creep up before stabilizing, which made no sense. However, it was then noted that when the steam pressure decreases, as it would when the gas temperature is lowered by SNCR injection, the computer control signals to increase the coal flow rate to restore the power drop. This results in more $NO_x$ from the added coal, and explains the $NO_x$ increase soon after SNCR startup. However, when operating at full power, it was not possible in this boiler to increase the coal flow due this plant's pulverizer capacity limits. This capacity limit is correctable, and increasing the coal flow can restore the "loss" of 1.8 MW.

For the 50 MW boiler at its 2005 reported Heat Rate of 12,300 Btu per kW-hr to recover the lost 1.8 MW from gas cooling at 50 MW gross output with the high ash coal would cost $26 per hr for coal at $30 per ton of coal. Alternatively, increasing the power with more high volatile, bituminous coal that the 50 MW plant uses for up to one-half of its power, would cost $53 per hr for coal at $60 per ton. So the added cost of the coal to offset the lost 1.8 MW would range from $26 to $53/hour, not $180 to $720 per hour if the "lost" revenue of $100 to $400 per MW-hr of electricity sales cannot be recovered by increasing the coal flow rate. Here is another example of the adverse economic effect of using low $NO_x$ burners, which decrease the overall efficiency, and increases unburned carbon losses.

Now to reduce the $NO_x$ from 0.3 lb/MMBtu to 0.18 lb/MMBtu at 45 MW, which occurs with a 550 MMBtu/hr heat input, would reduce $NO_x$ by 0.12*550=66 lb/hr=0.033 t/h. The SNCR process would consume about 132 lb or 0.066 tons of urea under proper operating conditions to which is added water injection to cool the gases in the droplet spray zone to the temperature at which SNCR is effective, namely below 2100° F. At summer 2005 market prices for urea of $320 per bulk ton cost, to $432 per ton retail in 50 lb bags, to overpriced $568 per ton for delivered 50/50 water/urea solutions, would yield a urea cost ranging from $21.12 to $28.51 to $37.48 per hour, respectively. The cost of $NO_x$ emission credits in 2005 was $2,500 per ton of $NO_x$, which equals $82.5 for the 0.033 tons of $NO_x$ removed. $NO_x$ emissions in the $4^{th}$ quarter of 2006 were $1000 per ton, equal to a $33/hr credit. The lowest urea and coal replacement cost of $47.12/ hr, (=$21.12/hr for bulk urea+$26/hr for high ash coal) suggests that a $NO_x$ emission credit cost above $1,500 per ton, equal to $49.5/hr is required to justify this SNCR emission process. This was the case from 2001 to the $4^{th}$ quarter of 2006, but not since then.

However, this conclusion is incorrect because it overlooks the cost of the lost unburned carbon of 2. MW, which equals $200 per MW-Hr to $800 per MW-hr, at electricity prices in the $100 to $400 per MW-hour power dispatched price range. So the higher dispatch prices far exceed the cost of Zauderer's SNCR process. This analysis led Zauderer to file in 2006 a Provisional Applications to reduce fuel rich combustion to reduce carbon loss. Therefore, replacing the low $NO_x$ combustion system with the Zauderer SNCR $NO_x$ control applied to stoichiometric combustion would allow complete combustion of the coal at no significant LOI.

Another major benefit of Zauderer's SNCR process is that there is no ammonia slip, as occurs in other conventional SNCR processes that produce ammonia slip even at low levels in the 2 to 5 ppm range, which is detrimental to the recycling of fly ash for commercial construction. It also can lead to liquid ammonia-sulfur compounds to deposit on air heater tubes.

The feature of Zauderer's present SNCR process invention is the disclosure that most to all low $NO_x$ burners can be modified or removed to enable efficient combustion at stoichiometric conditions of unity which eliminates unburned carbon loss (LOI) in low volatile Bituminous coals that generally have much lower sulfur content than the high volatile Bituminous coals used to achieve effective combustion under low $NO_x$ fuel rich combustion. For example, in the 50 MW boiler, stoichiometric combustion with total firing with the low sulfur, 29% high ash coals would restore conditions used exclusively prior to the 1998 conversion to low $NO_x$ combustion conversion, as is shown in FIGS. 1 to 3 herein. With the present low $NO_x$ burners, the low volatile waste coal must be augmented above one-half load with high volatile, high sulfur, bituminous coal that is about twice as costly and has about twice the sulfur of the high ash waste coal. The current high ash waste coal has ash contents ranging from 23.53% to 31.70%, and sulfur ranging from as little as 0.45% to 1.04%, and HHV from 9648 Btu/lb to 11,251 Btu/lb. The sulfur ranges from 0.93 lb/MMBtu to 2 lb/MMBtu of $SO_2$.

To validate the desirability of replacing the low $NO_x$ burners with the original near stoichiometric or excess air primary coal burners, this inventor examined the 50 MW plant's quarterly emissions filings with EPA since 1995, which is the earliest date that such information is publicly available on the Internet. These data show that the removal of the low $NO_x$ burners is warranted, as shown in FIGS. 1 to 3, herein.

FIG. 1 shows that in 1996, $NO_x$ was 0.5 lb/MMBtu, while in last quarter of 1998 when the low $NO_x$ burner conversion was presumably implemented, $NO_x$ decreased to 0.25 lb/MMBtu in 1999. Probably due to a change in the coal rank used in 2001, $NO_x$ increased to 0.38 lb/MMBtu in 2001. However, it decreased again to 0.3 lb/MMBtu and remained at that level to 2006. However, the $SO_2$ doubled from under 1.5 lb/MMBtu prior to the 1998 low $NO_x$ burner conversion to near double that level since then. This effect is shown more dramatically in FIG. 2 where $SO_2$ and $NO_x$ are plotted over their 1995 values as percent increases. While $NO_x$ was reduced by up to about 60% after the low $NO_x$ conversion, $SO_2$ initially increased by 50% and then more than doubled in 2005.

FIG. 3 shows the adverse impact of low $NO_x$ burners on $SO_2$ emissions even more emphatically in that the low $NO_x$ burners decreased $NO_x$ by only 200 tons per year from 350 tons in 1997 to 150 tons in the past 3 years. However, incredible this $NO_x$ reduction was accompanied with a 2000 ton per year increase in $SO_2$ from 1997 to-date, which was caused by replacing up to one-half of the high ash waste coal with high volatility, high sulfur, bituminous coal. Now at a $2,500 per ton $NO_x$ market price in effect from about 2003 to 2006, the low $NO_x$ burners decrease of $NO_x$ amounted to a $500,000 cost saving. Now according to EPA data until several years ago, $SO_2$ emission credits sold for $200 per ton, which would equal $400,000, and the $100,000 cost saving from $NO_x$ was not significant. However, beginning in 2003, $SO_2$ prices increased sharply until spiking to $1600 per ton in 2005, at which price the 2000 tons of extra $SO_2$ emissions cost a very large $3.2 million for $SO_2$. Even at lower prices of about $500 per ton since 2006, $SO_2$ emissions still cost $1 million. The current 2007 market price of $NO_x$ is near $1000 per ton, or $200,000 for the 200 tons, which equals 20% of $SO_2$ cost at the 50 MW plant. These data show another unrecognized and certainly not reported by anyone of the very adverse cost impact of low $NO_x$ burners. It is clearly unrecognized by EPA as the type and properties of the coal are not reported in the emissions data. However, in EPA Summary Annual Reports on $NO_x$ and $SO_2$ emissions, there is a clear divergence beginning early in this decade, where the former continues to decrease while the latter slowly increases.

To this cost disadvantage one must add the higher cost of bituminous coal, which has almost double the volatility of the low volatile, low sulfur waste coal whose cost is about $30 per ton. So for the 50 MW plant using a typical coal HHV of 21 million BTU per ton, low volatility, low sulfur, waste coal as the fuel for one-half of the heat input at a rate of 275 MMBtu/hr to replace one-half the plant's power output that is currently fired with high volatile, high sulfur, bituminous coal at $60 per ton, would save about $30 per ton. In 2005 the 50 MW plant consumed 3,263,000 MMBtu of coal, so 50% of this bituminous coal would have a cost $30×77,000 tons, which is a cost saving of $2.3 million.

Now using Zauderer's SNCR process to reduce $NO_x$ from 0.5 MMBtu without low $NO_x$ burners to 0.25 lb/MMBtu, or 200 tons, would require 400 tons of urea which would cost between $130,000 to $225,000, which is almost negligible compared to a cost saving of $2.3 million for removing the high volatility, high sulfur coal, and at least $1 million saving from lower $SO_2$ emissions.

These calculations show that by only focusing on the cost effectiveness of the SNCR process in terms of reduced power output from water spray cooling and the cost of urea versus the loss of electricity generation leads to an erroneous conclusion on the economics of the present SNCR system. It is a common error in analysis to seek a solution to the problem at hand, in this case lower $NO_x$ emissions, without considering whether the solution has adverse side effects. The flaw in the approach is recognized by the drug industry, which must demonstrate that there are no adverse side effects from a drug.

To repeat, Zauderer's SNCR process is effective in combustion gas zones whose average gas temperatures are above the peak $NO_x$-urea reaction temperature of about 2100° F. Also, it has no ammonia slip.

3) Another Example of Increasing $SO_2$ Emissions that were Probably Caused by Using Low $NO_x$ Burners The 50 MW boiler was selected as an example herein because the inventor is familiar with its operation from extensive tests thereon, including the types of coal that are used. Another boiler that was tested with an early version of this inventor's SNCR process in 1997 was rated at 40 MW coal boiler from the same manufacturer and about the same design as the 50 MW boiler, which enables it to be fired with low volatility, low sulfur coal and coal waste. This boiler is at a power plant within 100 miles of the 50 MW plant and contains four such 40 MW boilers, two of each have a common stack. The test was reported in Zauderer's U.S. Pat. No. 6,048,510. An early design of the Zauderer's SNCR injector was tested on this 40 MW boiler in 1997 and 40% $NO_x$ emission reduction from an initial 1 lb/MMBtu was measured with the use of only one injector and at a 37 MW output. This 1997 test proved that this SNCR process is effective in reducing untreated $NO_x$ of about 1 lb/MMBtu. The inventor has not had any subsequent contact with this power plant because the operator was not willing to invest in the minimal cost to permanently install this process.

Using the data reported on the EPA Web site for all power plant boilers in the U.S., this inventor determined that over the subsequent decade the emissions of the 40 MW boilers were gradually lowered by undisclosed means, (FIG. 4), although it is almost certain that low $NO_x$ combustion was installed. FIG. 4 shows that from 1996 through 1998 fairly high sulfur coal was used, of unreported properties, despite that this boiler's design is capable of firing high ash, low sulfur coal. The EPA reported data in FIG. 4 show that over the years $NO_x$ decreased much faster than the decrease in $SO_2$. Then beginning in 2002 as $NO_x$ emissions decreased below 0.6 lb/MMBtu, indicating low $NO_x$ burners were almost certainly in operation, $SO_2$ stopped decreasing. Instead $SO_2$ began to increase to the point when $NO_x$ decreased to 0.2 lb/MMBtu in the past several years and $SO_2$ doubled from 1.27 lb/MMBtu in 2002 to 2.4 lb/MMBtu. This performance corroborates the experience at the 50 MW power plant, namely as $NO_x$ decreases substantially, low $NO_x$ burners operate under very fuel rich conditions.

Figure 12:
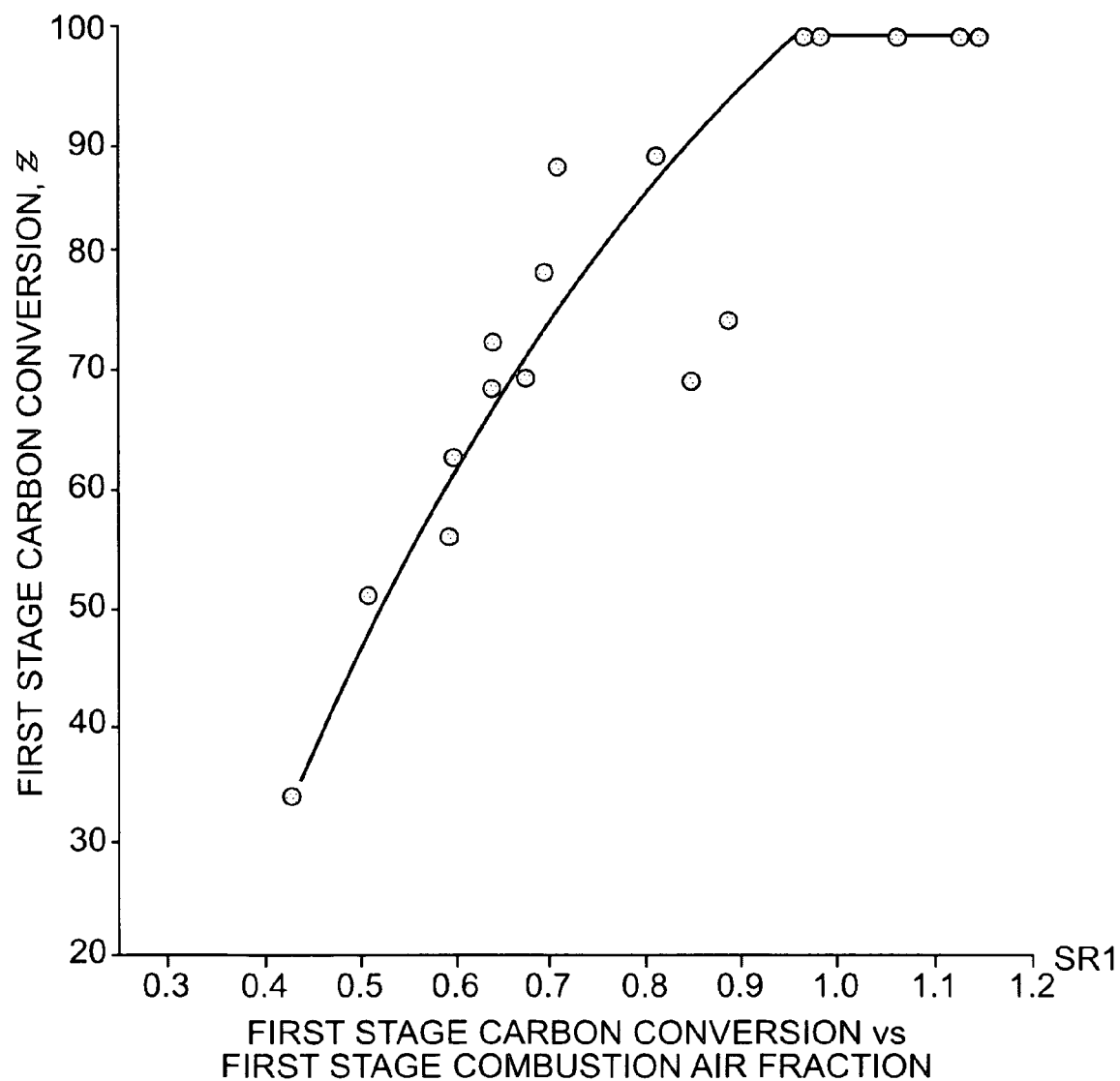
FIG. 12 is a graph showing experimental % carbon conversion in the $1^{st}$ stage of a 7 MMBtu per hour slagging coal combustor as a function of the stoichiometry in the combustor.

However, as shown FIG. 12 herein, which was also shown in FIG. 1 in Zauderer's U.S. Pat. No. 7,282,189 unburned carbon increased as the stoichiometry in a slagging combustor decreased from unity. The results in FIG. 12 were obtained in a 7 MMBtu/hour slagging combustor, which showed decreasing $NO_x$ with decreasing stoichiometry, as did tests in a 1 MMBtu/hr slagging combustor, and in the 20 MMBtu/hr slagging combustor, all conducted by the inventor with his research associates. As is well known to practitioners of the art, (e.g. DOE Report on "Coal Utilization By-Products" cited above), this unburned carbon results in unacceptable carbon levels in the fly ash. To partially offset the poor fuel rich combustion efficiency it would appear from the EPA data on coal fired power plant emissions, said plant operators turned to volatile coal where the volatiles can burn more readily than the solid carbon, and which increases $SO_2$ emissions. Short of installing extremely costly SCR $NO_x$ control, the only choice was using more high volatile coal to reduce LOI in low $NO_x$ burners. However, the use of high volatility but lower sulfur coals, which are classified as High Volatile Bituminous A, instead of the higher sulfur high volatile Bituminous B or worse C, apparently was not preferred or used, as evidenced by the fact that EPA does not require reporting the coals used to obtain the emissions of power plants.

FIG. 5 also shows the grossly adverse effect of low $NO_x$ burners on increasing $SO_2$ emissions. As the FOUR 40 MW boilers reduced $NO_x$ emissions from 0.5 lb/MMBtu in 2002 to 0.23 lb/MMBtu in 2005 (See FIG. 4), FIG. 5 shows that the $NO_x$ emission for all FOUR boilers were reduced by 2121 tons annually. However, as was the case in the 50 MW plant, this 2,121 ton $NO_x$ reduction was accompanied by an incredible increase of 9,522 tons of $SO_2$. Now clearly $SO_2$ has a worse adverse impact on health and the environment. Thus using low $NO_x$ burners are a "cure" for $NO_x$ could have a much greater adverse effect from $SO_2$.

Seeking this data and analyzing it from EPA's and DOE/EIA's Web sites was extremely time consuming and difficult because it is organized with information scattered over many different databases, each with complex instructions and difficult data retrieval, and worst of all no information on the type and properties of the coal used, which is critical to extract the information needed to evaluate the environmental performance and economics of power plants. All these data are necessary to properly practice this invention. In fact the information provided by these government agencies proves that this relationship between high sulfur coal needed to meet low $NO_x$ standards, as disclosed herein, has not been recognized. It also proves that no one, not private sector practitioners of $NO_x$ control nor EPA and nor the affected States' environmental regulation agencies were aware that increasingly stringent low $NO_x$ standards, as were imposed during the summer ozone season in 19 Eastern States would cause a shift toward higher sulfur, high volatile coal to achieve efficient combustion and minimum LOI at these low $NO_x$ levels. And since the entire USA $NO_x$ is only at 0.4 lb/MMBtu versus the EPA target of 0.15 lb/MMBtu, it indicates that worse $SO_2$ and LOI will probably occur or that the prohibitively expensive SCR process will be hoisted on the electric bills of American industry, commercial users, and consumers.

4) The Impact of Low $NO_x$ Burners on USA $NO_x$ and $SO_2$ Emissions

This deficiency came to this inventor's attention only after he attempted to apply his analysis of the 50 MW power plant emissions to the total United States $NO_x$ and $SO_2$ emissions from data on EPA's and DOE's Web sites for the 1994 to 2005 period. DOE's Energy Information Administration (EIA) Web data show that in this period, $SO_2$ and $NO_x$ decreased as shown in Table 1 in Millions of Metric tons (equal to 1.1 Short ton)

TABLE 1

Emissions from Conventional Power & Few Combined Heat & Power Plants-(Source DOE/EIA)

| | YEAR | | | | | | | | | | | |
|---|---|---|---|---|---|---|---|---|---|---|---|---|
| | 2005 | 2004 | 2003 | 2002 | 2001 | 2000 | 1999 | 1998 | 1997 | 1996 | 1995 | 1994 |
| Sulfur Dioxide ($SO_2$) | 10,340 | 309 | 10,646 | 10,881 | 11,174 | 11,297 | 12,444 | 12,509 | 13,520 | 12,906 | 11,896 | 14,472 |
| Nitrogen Oxides ($NO_x$) | 3,961 | 4,143 | 4,532 | 5,194 | 5,290 | 5,380 | 5,732 | 6,237 | 6,324 | 6,282 | 7,885 | 7,801 |

Following a sharp reduction of 18% in $SO_2$ equal to 2,576 million metric tons (MT) in one year, from 1994 to 1995, the overall reduction of $SO_2$ by 2005 from 1994 was only 4,132 million MT, or 29%, averaging 2.6% per year. In contrast, $NO_x$ was cut by 50%, or 3,840 million MT, which is almost equal to the $SO_2$ reduction despite having double the emission tonnage of $NO_x$.

The contrast between $SO_2$ and $NO_x$ is shown more dramatically for the entire US in FIG. 8 for the emissions measured in the stack in pounds per MMBtu. For the entire U.S., $SO_2$ decreased from 1.78 lb/MMBtu in 1994 to 1.05 lb/MMBtu, a drop of 41%. As in the total tonnage in the previous paragraph, a large reduction to 1.45 lb/MMBtu or 19% occurred in 1995, and only a further 28% in the 10 years since 1995. In sharp contrast $NO_x$ decreased from 0.96 lb/MMBtu in 1994/1995 to 0.4 lb/MMBtu in 2005, a decrease of 58% in 10 years.

The lesser decrease of $SO_2$ versus $NO_x$ is attributed to the nationwide use of low cost "low NOx burners" and to the modest increase of about 20,000 MW scrubber capacity (25%) between 1994 and 2005 from 80,000 MW capacity of 1994. This minimal reduction was certainly due to the extremely high cost of $SO_2$ scrubbers of well over $100 per kW. As a result, $NO_x$ was readily reduced, while $SO_2$ was reduced primarily by a massive shift from high sulfur Eastern Bituminous coals to low sulfur Western Sub-Bituminous coals. As can be deduced from EPA's emission data, the scrubbers were first installed on the power plants burning very high sulfur coal in the Eastern US high sulfur, bituminous region, mainly Appalachia and the Mid-West. The very high sulfur coal fired plants represent a smaller part of U.S. capacity as can be deduced from the nationwide $SO_2$ based on the sulfur in the coal, which decreased from 2.5 lb/MMBtu in 1994 to 2.13 lb/MMBtu in 2005.

The relative changes from coal type use versus $SO_2$ scrubber installation can be determined from DOE/EIA reports. It is also possible to determine which power plants installed scrubbers and at what time by examining the $SO_2$ and $NO_x$ control entries on the EPA emission Web sites. However, this information is provided in scattered and incomplete fashion on the EPA Web sites, which means that to analyze the impact of emission controls used is extremely time consuming and in many cases impossible due to missing information. This inventor spent weeks just to extract the information presented in this document. Furthermore, without information on the coals used in the power plants reports, the impact of various emission control processes is incomplete unless, as in the case of the 50 MW power plant, there is some knowledge on the coals used.

Nevertheless information to validate this invention was obtained by the following means: The overall production of Bituminous and Sub-Bituminous coals is reported by DOE/EIA, as are the annual $SO_2$ scrubber installations. Note however that EIA's Report on the average annual installed capital cost of $SO_2$ scrubbers are highly questionable because this inventor found specific utility cost reports that cite much higher costs. For example, EIA reports that in 1998, FGD scrubbers cost \$127/kW, with modest annual cost increases to \$141/kW in 2005. However, the two 550 MW coal fired boiler emissions that this inventor located on the EPA Web site shown herein in FIGS. 9 and 10, listed in that Utility's reports, a budgeted cost of \$450 million, which equals \$406/kW for installing $SO_2$ scrubbers. This cost discrepancy may explain the almost total lack of new scrubber construction in the past four years when presumably the worst $SO_2$ emitters have been taken some corrective action. The scrubber construction and installations total since 1994 is shown in Table 2 in MW capacity.

A large part of this sharp recent years decline in scrubber construction can be explained by increasing shift from high sulfur Eastern Bituminous coal to low sulfur Western Sub-Bituminous coal and by the shutdown of most very high sulfur coal mines. The shift from Bituminous to Sub-Bituminous coal in the U.S. between 1994 and 2005 and the change in $SO_2$ emissions from the shift in coals and the installation of $SO_2$ scrubbers are shown in Tables 3 and 4. For Western Sub-Bituminous coal, it was assumed that the coal sulfur would produce $SO_2$ of 1 lb/MMBtu. For Eastern Bituminous coal it is reasonable to assume that the first mines to be shut down are the highest coal sulfur mines and that $SO_2$ scrubbers would first be installed on power plants using this coal. A search of such power plants on the EPA data bases yielded a WV power plant that emitted 5.5 lb/MMBtu from 1994 to 2000, which coincided with the last burst of $SO_2$ scrubber orders, as shown in Table 2. To compute the $SO_2$ is was assumed both coals have a HHV of 21 MMBtu/ton

TABLE 3

Shift from Bituminous to Sub-Bituminous Coal Mined (Millions of Tons)

| Year | Bituminous | Reduction | Sub-Bituminous | Increase | U.S. Total Coals |
|---|---|---|---|---|---|
| 1994 | 640 | | 301 | | 1,034 |
| 2000 | 574 | −66 | 409 | 109 | 1,074 |
| 2005 | 570 | −4 | 474 | 65 | 1,131 |

Table 4 compares the change in $SO_2$ emissions from scrubbers and from changes in the Bituminous and Sub-Bituminous mined coals based on the assumption that the highest $SO_2$ emitting coals would be removed and fitted with scrubbers. The net change is then compared with the changes in $SO_2$ emissions reported by DOE/EIA and listed in Table 1 above. $SO_2$ for Bituminous coal was assumed at 5.5 lb/MMBtu for Mined coal & Scrubbers and for Sub-Bituminous coal at 1 lb/MMBtu.

TABLE 2

Installed Capacity of SO2 Stack Scrubbers in MW

| 1994 | 1995 | 1996 | 1997 | 1998 | 1999 | 2000 | 2001 | 2002 | 2003 | 2004 | 2005 |
|---|---|---|---|---|---|---|---|---|---|---|---|
| 80,617 | 84,677 | 85,842 | 86,605 | 87,783 | 89,666 | 89,675 | 97,988 | 98,673 | 99,567 | 101,492 | 101,648 |

The scrubbers increased from 23% of U.S. installed power plant capacity in 1994 to 29% in 2005. While installations increased gradually by a total of 11% between 1994 and 2000, there was a 9% increase in 2001, with very little since then. It was reported in the November 2007 issue of Power Engineering Magazine that 100,000 of FGD scrubber capacity is on order for the 2010 CAIR regulation. How much will be implemented?

TABLE 4

Change in U.S. SO2 emissions from Table 3 (Mining Shift) & Table 2 ($SO_2$ Scrubbers)-TONS

| Years | $SO_2$ from Bituminous | $SO_2$ from Sub-Bituminous. | Net $SO_2$ from Coal Change | $SO_2$ from Scrubbers | Total $SO_2$ change | Table 1. $SO_2$ change (EIA) |
|---|---|---|---|---|---|---|
| 1994-2000 | −3,811,500 | +1,144,500 | −2,667,000 | −659,489 | −3,326,489 | −3,492,500 |
| 2000-2005 | −105,000 | +682,500 | +577,500 | −1,998,358 | −1,420,866 | −1,052,700 |

The general agreement in the net $SO_2$ reductions as reported by DOE/EIA and deduced by this inventor from EPA emissions data appear to validate the assumption that the bulk of the $SO_2$ reduction in the past decade was a result of removal of very high sulfur coal by mine shutdown, shift to sub-bituminous, and scrubber installation. That there has been little mine shutdown or scrubber installation in the present decade indicates that the "low hanging fruit" have been picked and that further $SO_2$ reductions will be costly. Therefore, the trend in increasing $SO_2$ emissions as $NO_x$ is further reduced by low $NO_x$ burners and SCR suggests that both pollutants will increase sharply emission control costs. On the other hand, the present invention of using the inventor's SNCR process and $SO_2$ post-combustion process would result in major cost reductions for reducing both $SO_2$ and $NO_x$.

The above analysis of National U.S. emissions is meant to describe the analytical approach to take in deciding how to control said pollutants. There are too many different power plant boilers to draw a general conclusion on the relationship between low $NO_x$ burners and increasing $SO_2$ emissions. To achieve such an analysis one would have to evaluate each power plant's operations as was done here to some extent for the 50 MW, 40 MW and the 550 MW (discussed next) coal fired power plants. Even these three power plants require more information on the coal used to determine the best configuration for combustion and emission control. However, it is clear that low $NO_x$ burners are not a desired solution in that they require high volatile, high sulfur coal to burn effectively as the fuel rich conditions increase in order to reduce more and more $NO_x$.

5) Another Example of the Impact of Low $NO_x$ Burners on $SO_2$ Emissions at an 1100 MW Power Plant The final power plant submitted to prove this invention's reducing low $NO_x$ burner combustion can result in higher $SO_2$ emissions, is shown in FIGS. 9 and 10. This coal fired power plant consists of two 550 MW boilers, one of which is fired with Cell Burners. These two figures also show that as $NO_x$ was reduced, $SO_2$ increased, especially when $NO_x$ was reduced to under 0.3 lb/MMBtu in 2001. Interestingly the utility is about to begin installing a $SO_2$ scrubber system for both 550 MW boilers at a cost of $450 million or $406/kW, not $140/kW, as claimed by DOE/EIA. (The cited figure is in agreement with the upper range of FGD costs cited in the November 2007 issue of Power Engineering Magazine.

Therefore, practicing the present invention and Zauderer's prior $NO_x$ and $SO_2$ inventions could sharply reduce the costs for this plant, which is located in West Virginia, which has many high sulfur, high volatility coal mines. However, WV has also Bituminous-Rank D Low Volatility Bituminous coal with only 0.6% sulfur, a high HHV of 14,730, and only 17% volatility, which would not burn well at fuel rich conditions. However, the $SO_2$ in the coal is only 0.8 lb/MMBtu, which is far less than the 2.6 to 2.7 lb/MMBtu now used (FIG. 9). As discussed above, this low sulfur would require little limestone or lime for post-combustion removal of most of the $SO_2$ emitted. Using a Ca/S mol ratio of 3, which this inventor has used to reduce $NO_x$ by 80% in the 20 MMBtu/hr post-combustion zone, would require only 3.8 lb of limestone per MMBtu, or 2.8 lb/MMBtu of lime. In fact this reduction could also be achieved at a mol ratio of 2. This would be in addition to the $NO_x$ reduction with SNCR. The cost of the lime or limestone, the urea or ammonia and the low cost of this difficult to burn under fuel rich condition coal, would be an insignificant fraction of the cost of the planned scrubber. Also to be noted is that the addition of the lime or limestone will improve the cement properties of the coal ash and their market value.

The above provides sufficient evidence of the viability and benefits of the present invention and the inventor's prior inventions.

6) $NO_x$ Reduction by Reburn

Another process patented by Zauderer, U.S. Pat. No. 6,453, 830, teaches introducing additional fuel in or near the SNCR injection zone to convert the gases therein to fuel rich conditions by which Zauderer has experimentally reduced $NO_x$ by 50% in addition to any SNCR $NO_x$ reductions in the post-combustion zone and in addition to any fuel rich combustion $NO_x$ in the primary combustor zone. This reburn has the added advantage that gas cooling by further diluting the urea-water or urea-ammonia solution with water to cool the gases will not be necessary because under fuel rich condition, the urea-$NO_x$ or ammonia $NO_x$ reactions are effective at significantly higher gas temperatures than the 2100° F. SNCR ceiling. Therefore, this is another means by which $NO_x$ can be further reduced while allowing combustion of low volatile, low sulfur coals or waste coals to burn efficiently in the primary combustion zone at near or at stoichiometric conditions.

7) $NO_x$ Reduction in B&W Slagging Cyclone Power Plant Boilers

Use of the SNCR and Reburn $NO_x$ processes of the present invention has major implications for boilers fired with slagging cyclone combustors that were manufactured by the Babcock & Wilcox Company in the mid $20^{th}$ Century. Their mode of combustion requires excess air and as a result they emit high $NO_x$ levels of about 1 lb/MMBtu. These boilers cannot be converted to low $NO_x$ operation because the combustion would be totally inefficient. The only present commercial solution is costly SCR, which by coincidence an 800 MW, Mid-West Power plant is about to install on its B&W boiler. The utility announced a budget of over $250 million for the SCR addition, which may include the second 700 MW conventional boiler. If the latter is not included, or if the SCR applies to both boilers together, this cost of over $300 per kW is in line with reported costs of SCR system in an early 2006 issue of Power Magazine. In contrast, the present invention's installed cost is in the several dollars per kW range.

8) Application to $NO_x$ and $SO_2$ Reduction in Asian Boilers

The present invention on reducing $NO_x$ with Zauderer's SNCR process and removing low $NO_x$ burners would apply even more to Asian coals that have very high ash and are difficult to burn under fuel rich combustion. They appear to have no $NO_x$ control and operate will little or no emission controls. For example, China burns 2 billion tons of coal annually, about double the U.S. rate. The coal heat input for the U.S. in 2004 was $23 \times 10^{15}$ Btu, which equals 23 Quads. In 2004, China burnt 43 Quads, India 7.3 Quads and Indonesia 3.3 Quads, and Asia's total was 63 Quads, which is about one-half of the World's coal firing of 113 Quads. This means that despite all the complaints about U.S. $CO_2$ emissions from coal, it represent only 20% of the World's total, while China is at 38% of the total. Even worse, Asia emissions are growing alarmingly. In 1980 the US burned 19.6 Quads, 85% of current levels, while Asia burnt only 19 Quads, 17% of current levels. Therefore, the omission of Asia from the Kyoto Protocol will not significantly reduce worldwide $CO_2$ emission into the atmosphere Furthermore, it is probable that the lack of emission control on Asian boilers means that Asia's $NO_x$ emissions are likely about 1 lb/MMBtu, yielding 32 million tons of $NO_x$ annually, with China accounting for two-thirds, compared to US emissions of 4 million tons in 2005. The US 2005 $SO_2$ emissions were 1.05 lb/MMBtu from coals having a national average uncontrolled $SO_2$ content of 2.13 lb/MMBtu. Assuming Asia has the same average sulfur coal but no emission control results in $SO_2$ emissions of 67 million tons from Asia, which is an incredible 6.5 times the US emissions of 10.34 million tons.

Therefore, the use of the present $NO_x$ invention, as well as Zauderer's prior $SO_2/NO_x$ invention would have an enormous impact on reducing Worldwide $SO_2$ and $NO_x$ emissions.

9) Ash Conditioning to Improve Boiler Performance and Improve Environmental Performance 9.1) Slagging of Coal Ashes.

In addition to difficulties of combustion of solid carbon particles, ash in coal is one of the more difficult aspects of coal utilization. Liquid ash as slag deposits on furnace walls reduce wall heat transfer and large deposits can break off and rupture furnace walls water/steam tubes. Slag and ash can also deposit in the narrow spacing between tubes in the superheater and air heater. Fly ash can also place a heavy load on electrostatic precipitators and baghouses. Finally, volatile trace metals, especially mercury can pass through as vapors through particulate collectors into the atmosphere. These problems with ash are further aggravated by the composition of the ash. Iron oxides and calcium or magnesium oxides act as fluxing agents that depress the ash melting temperature that facilitates slag deposition in the combustion section, furnace walls and superheater sections.

In practicing this invention ash is divided into two groups. Group 1 consists of low (a few percent) ash coals to medium (about 10%) ash coals. Group 2 consists of medium (nominal 10%) ash coals, used primarily in the US, to high 20% to 40% coals used widely in Asia, especially China and India.

9.2) Group 1 Coals that Have Low to Medium Ash

These coals are primarily used in the U.S. where coal washing is widely used to reduce the ash in coal to 10% or less. Eastern U.S. coals have "acidic" ashes because of their high concentrations of alumina and silica, which have relatively high liquefaction temperatures, between 2500° F. to 3000° F. Liquefaction is defined as the temperature at which the viscosity of the ash is less than 250 poise. Iron oxides in the ash lower the viscosity and slagging temperature, as does calcium oxide or magnesium oxide. The effect of these metal oxides on slagging is shown in FIG. 7 that was published in the review book "Open Cycle Magneto-hydrodynamic (MHD) Electrical Power Generation", M. Petrick & B. Y A. Shumyatski, Editors, page 422, (1978). MHD Power is produced when a flowing, electrically conducting gas passes through a transverse magnetic field and the induced electric field generates a current that is collected through electrodes on opposing walls of the gas flow channel. The operating gas temperatures range from 3000° F. to 5000° F. and as a result the physical and chemical properties of the slag are critical to proper operation. Therefore, a great deal of research was implemented in this field in the 1960s through the end of the 1970s before the US National MHD program that was funded by DOE was terminated in 1981 by the Reagan Administration. The MHD work on slag was an extension of major research on slags by the steel industry in prior decades, which was published in topical books by the steel industry in mid-$20^{th}$ Century as well as in the Transactions of the American Society of Mechanical Engineering in the 1930s.

FIG. 7 shows how iron oxide and calcium oxide impact the slag flow temperature. A typical Eastern Bituminous coal (Slag type "A") with moderate iron oxides under 10%, and a few percent of CaO, has a slag fluid temperature of about 1750° C. (3180° F.), which is at or above the typical combustion temperature of coal, especially with fuel rich combustion, and as a result slagging would not be a significant problem in most pulverized coal boilers. However, some bituminous coals do have high iron oxides and above 16% the fluid temperature is about 1350° C. (about 2400° F.) and slagging is a significant concern to be addressed.

However, as restrictions on $SO_2$ emissions were imposed in the 1990's a massive shift to Western Sub-bituminous coals began as reported in Table 3 above. These coals have high CaO content in the 20% range, and above, and FIG. 7 shows the slag temperatures range from 1100° C. (2012° F.) to near 1400° C. (2550° F.). As a result boilers firing these coals have had problems with slagging in the furnace section.

In addition to the massive art in the literature on slags cited above, there are patents such as U.S. Pat. No. 5,894,806 and U.S. Pat. No. 5,740,745, assigned to Fuel Tech Corporation, that teach the use of magnesium or magnesium hydroxide in slurry form to increase the slagging temperature in black liquor boilers. Fuel Tech also markets a product FUEL CHEM to control slagging in boilers with little or no information on the process chemical contents. From the extensive literature it is clear that this involves the addition of magnesium compounds or calcium compounds which as can be seen from FIG. 7 at high concentrations of 60% increases the slag temperature to 2000° K. (3172° F.) which is at or above the combustion gas temperature. However, the teaching in these two patents does not call for such high concentration. Instead apparently minute of less than 1% concentrations are specified, which indicates a different processes from increasing the coal ash's slag temperature is at work. (The same comment applies to the Ecobik process.) A new process is disclosed by this inventor in Section 15 of this application that may also explain the operation of the Fuel Chem and Ecobik processes.

The teachings in the two Fuel Tech patents apply to pulp paper liquor boilers. However, as stated above there is extensive art going back at least 80 years on the fluxing action of iron and calcium and magnesium oxides that predates these teachings. Therefore, without more details, their application to coal fired boilers would be difficult to the specialist.

9.3) Comments on an Ash Conditioning Process Called ECOBIK

Since mid-2006, a company injected an ash/slag conditioning material into the 50 MW boiler of undisclosed composition, which they call ECOBIK, generally described on the Company's Web site www.kubik.ro with claims of applicability to boilers without specifying the nature of the product. However, on one of the company's Web pages under the heading "Fly and Bottom Ash" claims are made that solid deposits were removed from heavy liquid fuel fired boilers that increased sulfur by 60%, CaO by 90%, MgO by 90%, and NaO by 75% which strongly suggests that the EKOBIK process in this case consisted of injection of lime, or limestone, or sodium oxides. With no additional information, this process cannot be evaluated. Also, claims are made that $SO_2$ is reduced by 30-60% in black coal and $NO_x$ by 7-15%.

As noted above, the Company tested their process in the 50 MW boiler mostly continuously since mid-June 2006 by injecting their product into the coal burner zone, which is the hottest part of the furnace. The apparent concentration of injected material is a slurry at unspecified less than 1% of coal flow. The only results disclosed by the 50 MW plant operator was that the ash and slag deposits were reduced in the boiler's furnace walls and superheater section to the point where the need for soot blowing was sharply reduced. Also, in filings with the PA Dept. of Environmental Protection, one constituent was hexavalent chrome, a hazardous material.

This 50 MW boiler is fired with an anthracite waste coal with 23% to 32% ash, which consists mostly of alumina and silica, which is a type A slag as shown in FIG. 7, have a high ash melting temperature. Therefore, the minute concentrations injected cannot have influenced the slag melting temperature. Prior to initiation of their process, this inventor had to remove the lime-water injection nozzles from the upper furnace, because they claimed it would interfere with their process. Presumably lime would reduce the slagging temperature and increase wall deposits.

However, this claim of interference is without foundation as the minute concentration that they injected was orders of 10 below where slagging would be affected. Furthermore, this inventor's SNCR injectors are placed at the $6^{th}$ boiler furnace level immediately upstream of the superheaters where the gas temperature measured there at 47 MW (full power) on Nov. 3, 2006 was 2372° F. and 2341° F. with an IR temperature meter, which is in the range measured the previous years prior to SNCR injection. However, this SNCR-water solution injection rate cools the gases there to at least 2100° F. (1150° C.), and FIG. 7 shows that even at 20% to 30% CaO in typical ashes with low (<8%) to medium (<16%) iron oxide, the slag melting temperature is 200 to 250° C. higher than the cooled gas temperature. Now the $SO_2$ emissions in the 50 MW boiler are between 2 and 3 lb/MMBtu. The ash is about 25%, or 25 lb/MMBtu. The most that would be injected is to achieve a Ca/S of 2, equal to 5.8 lb of lime per MMBtu, which equals 19% of the ash-lime. This would not affect the slagging in the upper reaches of the boiler, and it suggests that the Company does not have an explanation for their process. As noted an explanation is offered in Section 15, and an alternate solution to both these slag control processes is offered.

September 2006, and by this inventor's SNCR $NO_x$ process during the $2^{nd}$ half of June, the $2^{nd}$ half of July, and the first half of August, with several days in September 2005. Also shown are the summer 2004 emissions with no testing.

A critical item is that the summer of 2005 was much hotter than 2004 and 2006 with about double the number of Degree Cooling Days, meaning that air conditioners ran more in 2005. This was validated by the power plant's output log that showed 82% of 2005 operating hours were at full power, while in 2004 it was only 71%, and presumably no higher in 2006 over 2004. This had a very sharp impact on the 2005 SNCR results because (unknown to this inventor) a water flow restriction device had been installed prior to the start of the tests in June 2005. As a result inadequate cooling occurred of the gas in the SNCR injection zone at full power and $NO_x$ reductions were low, as opposed to reduction of 40% to 44% at half power down to 0.15 lb/MMBtu. This water flow restriction was not discovered by the inventor until the last week of September 2005 and upon its removal, $NO_x$ was reduced at full power by about 40% to 0.15 lb/MMBtu. Despite this limitation at full power and operation of SNCR at only 50% of the time each month, the recorded $NO_x$ reductions were higher in June, July, and August 2005 than the year before and after.

As for the other Company's claim that ECOBIK process would remove $SO_2$, the results in Table 5 do no confirm this claim. Instead $SO_2$ was higher than in the previous two years. Note that $SO_2$ was lower in 2004 because with more part load operation more high ash, low sulfur coal was used.

NOTE: Table 5 was taken from EPA's Web Site on Ozone Season Emissions

TABLE 5

50 MW COAL FIRED POWER PLANT EMISSIONS-SUMMER 2004, 2005, 2006

| Year | Month | Degree Cool Day | Operating Hours | MW-Hours | MW-Average | Heat Input (MMBtu) | Heat Rate (Btu/kW-hr) | SO2 (tons) | SO2 (lb/MMBtu | NOx (Tons) | NOx (Lb/MMBtu |
|---|---|---|---|---|---|---|---|---|---|---|---|
| 2006 | 6 | 104 | 675 | 21,827 | 32.34 | 279,752 | 12,817 | 357 | 2.55 | 38 | 0.26 |
| 2006 | 7 | 271 | 654 | 23,789 | 36.37 | 298,834 | 12,562 | 372 | 2.49 | 41 | 0.27 |
| 2006 | 8 | 184 | 708 | 25,453 | 35.95 | 315,131 | 12,381 | 362 | 2.30 | 45 | 0.28 |
| 2006 | 9 | 13 | 647 | 17,947 | 27.74 | 239,370 | 13,338 | 263 | 2.20 | 34 | 0.28 |
| 2005 | 6 | <u>260</u> | 720 | 22,145 | 30.76 | 275,490 | 12,440 | 364 | 2.64 | 33 | <u>0.24</u> |
| 2005 | 7 | <u>329</u> | 744 | 26,863 | 36.11 | 332,610 | 12,382 | 363 | 2.18 | 41 | <u>0.24</u> |
| 2005 | 8 | <u>331</u> | 744 | 27,816 | 37.39 | 339,639 | 12,210 | 392 | 2.31 | 40 | <u>0.23</u> |
| 2005 | 9 | <u>128</u> | 720 | 25,774 | 35.80 | 318,170 | 12,345 | 407 | 2.56 | 41 | 0.26 |
| 2004 | 6 | 82 | 706 | 22,740 | 32.21 | 281,344 | 12,372 | 273 | 1.94 | 37 | 0.26 |
| 2004 | 7 | 164 | 744 | 25,449 | 34.21 | 312,179 | 12,267 | 282 | 1.80 | 41 | 0.26 |
| 2004 | 8 | 153 | 724 | 22,507 | 31.09 | 282,286 | 12,542 | 277 | 1.97 | 37 | 0.26 |
| 2004 | 9 | 41 | 720 | 21,835 | 30.33 | 273,314 | 12,517 | 209 | 1.53 | 37 | 0.27 |

Note 1:
Ecobik's Slag Control Tests-July, August, September 2006
Note 2:
Coal Tech's SNCR NOx Control Test: s Last 2 weeks June, Last 2 weeks July, First 2 Weeks-August, 2005
Note 3:
No tests tests in 2004.
Note 4:
Summer 2005 Degree Cooling Days Double that of 2004 & 2006
Therefore, Summer 2005 operation was at 82% full power capacity versus 71% in cooler 2004.
AND Full Power NOx reduction reduced by about one-half due to undiscovered cooling water flow restriction.

9.4) The 50 MW Boiler's Emissions in the Summer of 2004, 2005, and 2006

The next question is whether the material injected by the ECOBIK reduced $SO_2$. Table 5 shows the monthly emissions from the 50 MW Plant for June through September when the ECOBIK process was tested from mid-June to the end of In any case, from the evidence presented, the use of the ECOBIK appears to only reduce slagging. However, focusing on slagging is the wrong solution for two reasons. One is that unless very costly FGD is installed there is no other means of reducing $SO_2$ for which lime, limestone, or sodium oxides or sodium hydroxides are needed to remove the $SO_2$ from the combustion zone. Two, it is almost certain that the slagging is greatly aggravated by operating the boiler under fuel rich combustion with overfire air. As a result substantial unburned carbon is transported to upper regions of the boiler where it burns and since the ash concentration is so high, the ash converts to slag and melts in the entire furnace walls and even in the superheater section.

A proof of burning of carbon in the upper furnace was found in one test on $NO_x$ control with SNCR in 2005, the outer water cooled stainless steel tubes on one side wall of the boiler wall melted because coal powder blew up from the lower burner zone and burned on the outer wall cooling tube and melted it. So the proper solution as disclosed in the previous section, is to operate the primary coal burner zone at near stoichiometric conditions. In that case, the ash will melt and drain to the bottom of the boiler for removal, for which function this boiler was designed as a wet bottom boiler. The upper section of the boiler will only have Type A ash as per FIG. 7, which will not melt. Now adding lime or limestone in the upper furnace region with the SNCR will occur at temperatures of 2100° F. (1150° C.), which, as noted above, is below the slag melting temperature at the CaO concentration needed to reduce the $SO_2$.

9.5) Group 2 Coals with High Ash

The preferred means for dealing with high ash coals is to burn them in slagging combustors; a practice that was introduced in the first half of the 20$^{th}$ Century in Europe. In the U.S. with its abundance of low ash coals, the Babcock-Wilcox Company introduced the slagging cyclone combustor to be fired with crushed coal, which is less expensive to prepare than pulverized coal. However, this requires high excess air in order to scrub and burn the coal that lines the slagging combustor wall. This results in very high $NO_x$ emissions of 1 lb/MMBtu. As stringent $NO_x$ emission standards were enforced, these boilers were either shutdown or had SCR systems installed, as the SCR at one Midwest 800 MW boiler at a cost of $270 million, which is extremely high even if that cost may include a parallel conventional boiler of equal rating.

Figure 11:
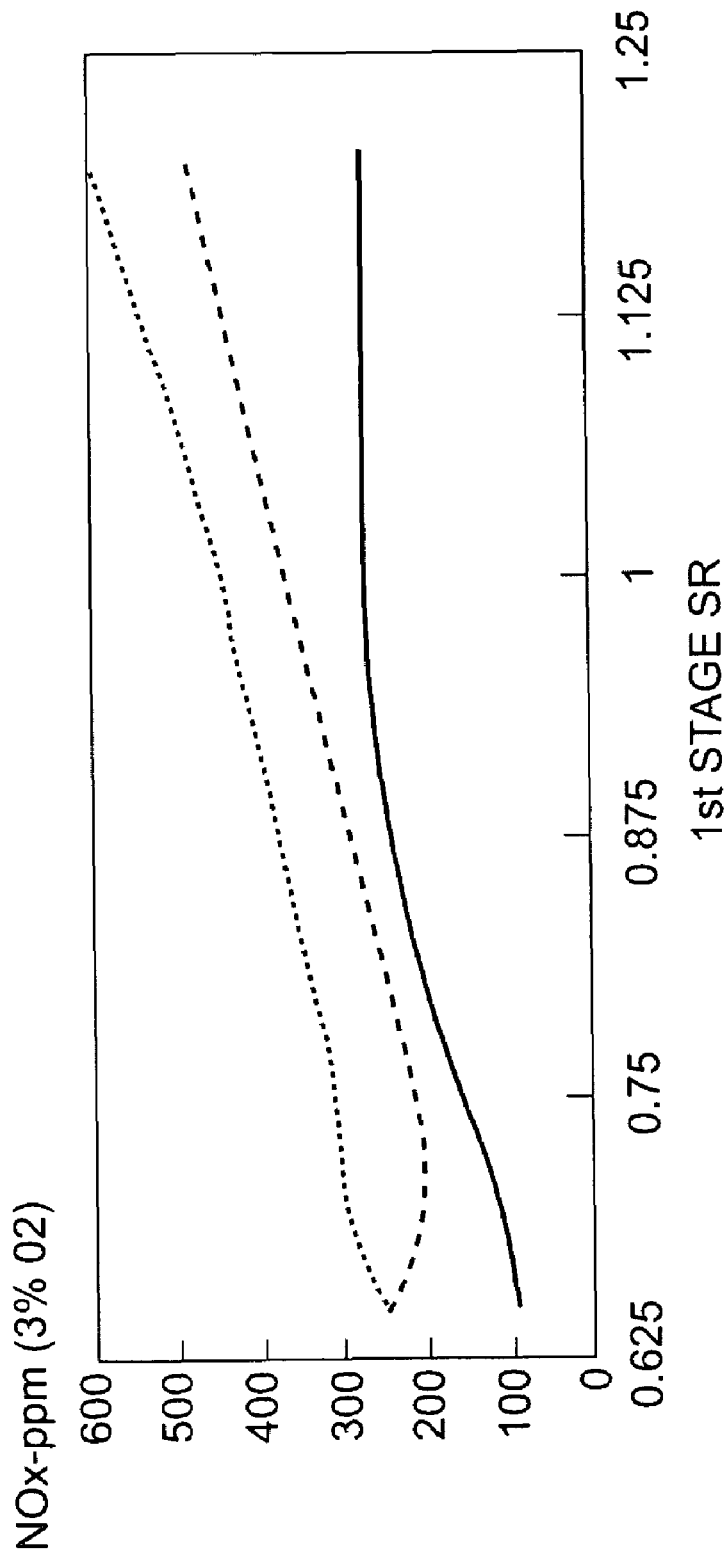
FIG. 11 is a graph showing the NOx emissions in ppm at 3% $O_2$ versus $1^{st}$ combustion stage stoichiometry in 1 MMBtu per hr, 7 MMBtu per hour, and 20 MMBtu per hour slagging coal combustors.

On the other hand, pulverized coal burning in suspension in the slagging combustor can reduce $NO_x$ under fuel rich operation. A water wall cooled combustor was developed by TRW Corporation and installed on a new 50 MW boiler in Healy, Ak. at a rating of 400 MMBtu per combustor. This combustor had high water cooling thermal losses of up to 20%. Component failures in the pneumatic pulverized coal feed system resulted in termination in its development. In contrast, Zauderer developed an air-cooled slagging combustor whose early design is described in U.S. Pat. No. 4,624,191. FIG. 11 shows the $NO_x$ performance of this 20 MMBtu/hr combustor, which is described in detail in U.S. Pat. Nos. 6,048,510 and 6,453,830.

The 20 MMBtu/hr-combustor was used to burn U.S. coals with ash from 3% to over 10%, and an Indian coal with 37% ash. In addition to internal $SO_2$ and $NO_x$ reductions, this combustor can retain volatile trace metals, such as arsenic and mercury in the slag, with retention increasing as the slag flow increases, as would occur with high ash coals as disclosed in Zauderer's U.S. Pat. No. 7,247,285, issued Jul. 24, 2007. This air cooled slagging combustor is ideally suited for the high ash coals that are fired in Asian coal fired boilers.

9.6) Ash Control in the Conversion of Oil & Gas Design Boilers to High Ash Coals The air cooled slagging combustor's unique applications is conversion to coal of oil or gas design boilers that have a several times greater heat release per unit volume as coal fired boilers. The combustor removes up to 80% of the ash as slag. This has been validated in 1000's of hours of tests in Zauderer's Coal Tech Corp. 20 MMBtu/hr combustor.

A new application for air-cooled combustors is now disclosed, namely using the combustor to remove 80% of the coal ash as slag. Then to limit ash/slag deposits in the boiler walls and water/steam tubes, injecting in the combustor exit metal oxides to increase the slag melting temperature in the boiler with lime, limestone, silica, alumina, iron oxide, and alkali oxides, depending on the chemical composition of the ash. Separately lime or limestone is injected in the air-cooled slagging combustor to lower the slag melting temperature to drain the slag, and also reduce $SO_2$ in the combustor, as described in Zauderer U.S. Pat. Nos. 4,624,191, 4,765,258, 6,722,295, and 7,247,285, all of which are incorporated by reference in their entireties.

Instead of metal oxide injection for slag control in the post-combustion zone of the air-cooled, slagging combustor, air is injected into the immediate post combustion zone to reduce the combustor exhaust gas temperature to 2000° F. or somewhat below, where the $SO_2$-lime or limestone reaction is effective, while preventing liquid slag formation. The air comes from air-cooling tubes that cool the air-cooled combustor and exhaust nozzle walls. By this means an oil design boiler can be used with high ash coal, with slag removal in the combustor, and using combustor cooling air to lower the boiler gas temperature below slagging temperatures to prevent slag blockage in downstream boiler gas combustion passages, while permitting $SO_2$ reduction with lime or limestone.

9.7) Ash Control in the Conversion of Oil & Gas Design Boilers to Low Ash Coals

Another similar procedure is disclosed herein in the present application on the conversion of oil or gas boilers to very low ash coals, such as Indonesian coal that has only 1 to 4% ash, but has a high iron oxide (10% to 20%) and moderately high CaO (5% to 10%). In this application a conventional simple coal burner, as are commercially available, is used to replace the existing oil or gas burners on the boiler and fired under excess air conditions to assure complete combustion with no unburned carbon, i.e. no LOI. Additives identical to those identified above, e.g. lime, or alumina, or alternatively, as disclosed in Section 15 below, are injected in the immediate combustion gas exhaust to prevent slag formation. In case of Indonesian coal properties that have a slag flow temperature of 1180° C. (2156° F.) under reducing conditions, and 1230° C. (2226° F.) under oxidizing conditions, the additive would be silica and/or alumina to increase the melting temperature. This coal has 0.3% sulfur and a HHV of 8640 Btu/lb. Therefore, to remove 80% of this $SO_2$ requires injection of limestone at a Ca/S mol ratio of about 2 but no more than 3, which equals 3.25 lb/MMBtu that is added to the 4.64 lb/MMBtu of coal ash. This will increase the CaO to 33% and with the 10% to 20% iron oxide in the ash, the slag flow temperature deduced from FIG. 7 would be about the same as without the added CaO. Therefore, it will be necessary to introduce additional air into the exhaust combustion gas stream to cool the gases to below the ash melting temperature. Note that this additional air is introduced in pipes placed around the circumference of the coal burner. Also, with this low ash there is no need for a slagging combustor. Now to remove volatile trace metals such as arsenic and mercury, activated carbon is injected in the exhaust duct of the boiler, as disclosed in Zauderer's U.S. Pat. No. 7,282,189, with or without the use of highly porous calcium oxide particles produced in the post-combustion $SO_2$ reduction zone, for additional mercury and arsenic capture, as disclosed in Section 13 below.

A major benefit of the method disclosed herein of using very low ash coal to existing oil design boilers is the huge capital cost reduction compared to erecting new coal fired boiler systems, such as Circulating Fluid Bed (CFB) boilers, which are basically designed for high ash coals, but not several percent ash coals. The cost of the entire coal system, including coal handling and preparation, conventional coal combustor, emission control, and stack particulate ESP or baghouse, is estimated at about 10% or less of a similar rated CFB.

10) Efficient Operation of a Power Plant that is Supplied by a Coal-Water Slurry Pipeline A coal slurry pipeline with 50% pulverized coal and 50% water is one means for providing coal to a power plant where on site storage of coal is unavailable. However, this causes several difficult problems.

One is that currently the slurry passes through centrifuges to remove about one-half the water in order to burn the coal. Even then the high remaining water content and the tendency of the coal to agglomerate means the combustion is uneven. This results in combustion gas pulsations with uneven concentrations of fly ash. This is further aggravated when using low $NO_x$ burners. The solution disclosed herein is to replace the burners with air-cooled slagging combustors that can burn the slurry as delivered with 50% water. A 70% coal-30% water slurry was burned very efficiently in the 20 MMBtu/hr, air cooled slagging combustor in 1987. The coal ash concentration was 3% and there were no slag deposits after combustion of 2000 gallons. Therefore, the procedures disclosed herein can be used to burn the 50/50 slurry. For medium to high ash coals, the slagging air-cooled combustor is used, and for low ash coal this refractory lined combustor can operate in a non-slagging mode. Also to assure uniform combustion, the stoichiometric ratio will be greater than 1. $NO_x$ will be controlled with SNCR and if needed, with Reburn. Lime or limestone injection will remove $SO_2$. The major advantage of excess air combustion will be to assure uniform combustion to eliminate ash pulsations that degrade ESP or FFB performance.

The second problem solved herein is replacing the lost water in the slurry. In arid regions such a water loss is unacceptable. Therefore, it is disclosed that the exhaust combustion gas be cooled to about 150° F. with heat exchangers or a water spray. This will condense about 75% of the water, which can then be pumped back to the source in a second pipeline.

All other environmental controls can be addressed with Zauderer's patents and pending patents.

11) Gas or Liquid Fuel Production From Coal Volatiles with $CO_2$ Removal and Sequestration U.S. Pat. No. 7,282,189, issued Oct. 16, 2007, "Production of Hydrogen and Removal and Sequestration of Carbon Dioxide from Coal Fired Furnaces and Boilers" also forms a basis to the present invention, where in place or in addition to $H_2$ production, coal volatile matter is converted to high BTU gas such as methane by methanation or liquid fuel with Fischer-Tropsch synthesis. (U.S. Pat. No. 7,282,189 is incorporated in its entirety by reference herein.) However, the process for the treating the residual char is the same as in said patent. For example, the process whereby the char combustor is operated fuel rich to generate and collect 20% of the carbon for subsequent combustion and $CO_2$ removal and sequestration can also be implemented by treating this char fuel in the various means disclosed in the present Application.

Concluding Comments from Sections 1 Through 12 Above

The above material is based on the contents of the U.S. Provisional Application No. 60/883,683, filed Jan. 5, 2007. The following few paragraphs summarize the highlights:

A) This inventor has uncovered that almost the universally used low $NO_x$ coal burners to reduce $NO_x$ has resulted in much greater $SO_2$ emission because the increase in $NO_x$ reductions required greater use of high volatile, high sulfur coals to achieve acceptable carbon burnout of the coal. However, high $NO_x$ reductions complicate combustion and result in considerable carbon fuel loss. This also facilitates slag buildup and blockage in the boiler gas passages. In addition to loss of carbon as a fuel, more than 5% carbon in the fly ash essentially eliminates its use as a marketable product.

B) To correct the problems listed in paragraph 1, a counterintuitive solution is disclosed herein of operating the primary combustion zone at slightly less to stoichiometric ratios of unity in order to achieve complete combustion. This will allow the use of low volatile, low sulfur coal that will have low $SO_2$ emissions. Post-combustion SNCR, with or without adding lime or limestone for $SO_2$ control to the urea/ammonia-water solution, will be used to reduce $NO_x$ to its original level, or below that level. Also, the lime/limestone injection will further reduce $SO_2$ released from the low sulfur coal. Also, the addition of the lime or limestone will increase the calcium oxide in the fly ash, which greatly increases its market value.

C) It is also disclosed to use conventional coal burners to replace the oil or gas burners on oil or gas designed boilers when fired with low ash coals, and to also use post-combustion SNCR and lime injection to control $SO_2$ and $NO_x$ emissions. In addition, metal oxide additives and post-combustion air injection are used to limit or prevent slagging of the fly ash that would enhance blockage of boiler gas passages.

D) A similar process of slag control is disclosed but with an air-cooled, slagging combustor to improve combustion efficiency and emission control as in paragraph 3 for coals with medium to high ash of 10% to 40%.

12) Comparing Commercial $NO_x$ Control Processes with Zauderer's Processes:

The Provisional Application, from which the present Application is derived, identified an EPA Web site that lists the emissions of all US coal fired power plant from hourly to annually, each year since about 1997. Its format was upgraded in late 2006 to identify $SO_2$ and $NO_x$ emission technologies, if any, used by every US boiler. With this upgrade it is now possible to obtain the performance of US boiler in a readily usable format. However, even now, this information is not complete. Missing are the coal type used, and other data such as ammonia slip with SCR and SNCR $NO_x$ controls. Some such information can be obtained from other publications, such as DOE, EPA, or technical publications, but with great difficulty.

In any case, the new EPA emission data enabled this inventor to compare Zauderer's emission data as reported in his granted and pending patents with other commercial emission control technologies and processes. Table 6 shows these $NO_x$ data, for the 5-month summer ozone season, May 1 to Sep. 30, 2005.

TABLE 6

NO$_x$ Emissions for of U.S. Utility Coal Boilers-5 mo. 2005 Ozone Season

| Process | No. Boilers | Capacity-MW | % of U.S.MW-hr | NO$x$-lb/MMBtu |
|---|---|---|---|---|
| Low NO$x$ only | 545 | 155,401 | 61% | 0.31 |
| SNCR | 55 | 9,494 | 4% | 0.3 |
| SCR | 169 | 76,918 | 35% | 0.08 |

The combined U.S. coal power plant capacity of 241,813 MW in this Table is 77% of the summer capacity reported by EIA/DOE. This is consistent with EPA's report on the Thermal Capacity of each boiler, which shows that US coal fired boilers operate at about 80% of capacity. Even this figure is too high because many boilers, even the largest, operate in a daily load following mode, in which certain periods of low load, especially at night, power is reduced by up to 50%. The actual U.S. coal power generation for the 5-month 2005 ozone season was 775,567,797 MW-hr. When extrapolated to 12 months this equals 92% of EIA/DOE reported annual MW-hrs for 2005. Therefore, Table 6 provides a summary of US NO$_x$ emissions by control process. Table 6 shows three surprising results.

(A) The average NO$_x$ emitted by the commercial SNCR processes is about the same as achieved with various forms of low NO$_x$ burners. There are only a few with lower emissions. This would explain the limited number of SNCR conversions in recent years. In contrast, Zauderer's patents and patent applications reported NO$_x$ levels with SNCR as low as 0.07 lb/MMBtu in a 20 MMBtu/hr coal fired boiler, and below 0.15 lb/MMBtu in a 50 MW coal fired boiler. Furthermore, his process is unique in that with proper placement of the urea or ammonia injectors, there was no measurable (<0.5 ppm) ammonia "slip". In the other commercial SCR and SNCR processes, containing ammonia slip has been a performance limiting issue.

(B) Also surprising is that SCR NO$_x$ emissions averaged out at 0.08 lb/MMBtu, which is about the same as Zauderer's SNCR results of 0.07 lb/MMBtu, reported a decade ago at several DOE conferences. The 0.07 lb/MMBtu was achieved from an initial 1 lb/MMBtu by using fuel rich combustion in a slagging coal combustor, followed by SNCR injection with urea or ammonia to 0.07 lb/MMBtu (U.S. Pat. No. 6,048,510, filed Sep. 30, 1997). Except for a few SNCR tests on two coal-fired utility boilers in 1997, all proposals after 1997 for government support to testing of this SNCR process on coal fired utility boilers were rejected. The extensive SNCR NO$_x$ testing reported in Zauderer's subsequent patents and patent application were all conducted without government support.

Examination of EPA emission data back to 1997, that became available in 2007, did not reveal similar low capital cost processes that reduced NO$_x$ to 0.15 lb/MMBtu, much less to 0.07 lb/MMBtu. The EPA data also revealed that in the late 1990s the very costly SCR installations began in significant quantities by US utilities.

The invention disclosed in U.S. Pat. No. 6,048,510 was followed by other NO$_x$ control inventions by this inventor as additional research was conducted. Specifically:

a) The latest invention, (U.S. Ser. No. 11/668,929, filed Jan. 30, 2007, which is incorporated in its entirety herein by reference) offers a counterintuitive means of reducing NO$_x$ by minimizing or even removing low NO$_x$ burners, which increases NO$_x$ in the primary combustion zone but enables substitution of high volatile, high sulfur Bituminous coal, with low volatile, low sulfur Bituminous coals. NO$_x$ is restored or even reduced below previous levels with Zauderer's SNCR and reburn processes.

b) Also, adding biomass reburn to reduce NO$_x$ as disclosed in Zauderer's U.S. Pat. No. 6,453,830, would lower NO$_x$ to levels achieved by SCR. In addition the biomass would reduce $CO_2$ emissions by at least the 15% mandated by the U.S. House of Representatives in the Energy Bill passed by them on Dec. 6, 2007. (U.S. Pat. No. 6,453,830 is incorporated in its entirety herein by reference.) Although blocked by the Senate on Dec. 13, 2007, this issue will likely be revisited. $CO_2$ reduction with biomass reburn would cost a small fraction of the widely publicized portion of the Bill that emphasizes extremely costly wind and solar power, c) Furthermore, SNCR and Biomass do not have the significant adverse side effects of SCR. For example, a Dutch researcher has recently reported tests on reducing NO$_x$ with biomass in a nominal 500 MW coal fired-boiler equipped with SCR. He found that the alkalis found in most biomass attack and degrade the SCR catalyst necessitating more frequent replacement of this costly component.

d) Furthermore, catalysts in SCR reduce molecular mercury to atomic mercury, which is much more difficult and very costly to remove, especially by the currently favored method of Activated Carbon Injection.

e) On top of all these adverse effect of SCR, a most important one is the extremely high capital cost and the high cost of regularly replacing the catalysts after several tens of thousand hours of operation. The capital cost reported in the technical literature ranges from $100 to $200 per kW. Also, costs above $300 per kW have also been reported for smaller coal power plants, which make up about two-thirds of US installations. Consequently, essentially all SCR installations have been in large power plants. However, as is shown herein, this capital costs is substantially higher when compared to the alternatives, as presented herein.

These capital costs are reported in EPA, DOE and technical literature reports, such as Power or Power Engineering Magazines. Equipment manufacturers and utilities have been reticent in reporting SCR costs for "competitive" reasons. However, regulated utilities have reported expenditures.

The following example taken from public information for one regulated utility shows the high capital cost impact of SCR costs in comparison to other low capital NO$_x$ control processes. This regulated utility converted in 1999 two of its coal-fired boilers rated at a combined about 1,500 MW to SCR in 1999, at a cost of $225 million, which works out at an industry mean $150 per kW. The SCR went into operation of Jun. 1, 2001, one month into the 5-month 2001 Ozone season Here are three options reviewing the 1500 MW plant's 1999 SCR installation decision:

1. Install SCR: Retain existing low-NO$_x$ burners and OFA that yield NO$_x$ in the 0.44 lb per MMBtu range and purchasing NO$_x$ emission allowances at the average market price in effect during each 5-month Ozone Season from 2001 through 2007. OR 2. Install SNCR: Increasing Low-NO$_x$-OFA reduction to 0.3 lb/MMBtu which in fact the plant reported 1999, and installing this inventor's SNCR process at as cost of a few dollars per kW to reduce NO$_x$ to the 0.15 lb per MMBtu measured in the 50 MW boiler, and purchasing emission credits to duplicate the 0.08 lb per MMBtu SCR NO$_x$ output.

3. Install SNCR & Reburn: NO$_x$ allowance purchase would not be necessary by adding this inventor's reburn process with coal. If a 15% Utility Renewable Generation Law as passed by the House in December 2007 but not the Senate, became law, this Option would be the winner.

$1^{st}$ Solution-SCR: The calculations focus only on the capital cost of SCR, which is the primary cost. According to DOE, the annual capital charge for a power plant project is 16%. So the $225 million for the SCR in this 1,500 MW plant, equals $36 million per year, and in 7 years from 2001 to 2007, this accumulates to $252 million. Now in the 7 years, 11,062 tons of $NO_x$ were emitted by the SCR equipped plant. Without SCR at an original nominal 0.4 lb/MMBtu, 59,185 tons of NOx would have been emitted. Therefore, the capital cost component for the SCR equals $252 million/(59,185-11,062) tons, which equals $5,237 per ton of $NO_x$ reduced.

The market price of allowances on the spot market from 1997 through 2007 is scattered in a number of places at EPA web sites and private market maker's sites. The prices fluctuated widely, with a peak of $6,000 to $7,000 per ton over several months in 1999, the time when this plant owner decided to install the SCR. Another peak of $6,000 was in one month in early 2003, the year EPA reduced $NO_x$ to the 0.15 lb/MMBtu limit. The rest of the time prices remained on a broad band but narrower range. In 2001 it was about $1,500 per ton, 2002 about $5,000 per ton, 2003, $5,000 per ton, 2004 about $3,500 per ton, 2005 $2,500 per ton. Then a descent began to $1,000 per ton in 2007. The two spikes in 1999 and 2003 were most probably due to speculators. However, the reason for the low prices at other times, especially in 2007 can be found on EPA's Web site that shows that during this decade Unused Allowance from the previous year about equaled actual emissions. This means that these unused allowances almost certainly came on the market from time to time, especially in 2007 because beginning in 2009 or 2010, $NO_x$ control will go to all year and unused allowances will be removed. This suggests that $NO_x$ prices could escalate after 2010, but did not in this decade.

The key conclusion from the 1st Solution shows that if the 1,500 MW power plant had purchased $NO_x$ allowances since 2001 instead of the installing SCR, the estimated total cost would have been $155 million, a saving of $107 million, below the $252 million 7 year capital cost, a 40% saving plus catalyst cost saving.

SCR Catalyst Cost: The other major cost element in SCR is catalyst replacement, which occurs in about every 2 to 3 or so years of year round operation. There is a wide range of cost estimates for this, and it is about 20% of annual capital cost according to EPA. To save this cost all current SCR equipped power plants have not operated in the 7-month non-ozone season. Since there was no emission requirement in the 7-months, the 1,500 MW plant emitted 79,000 tons in the 7-month periods from 2001 to 2007, at a rate of 0.44 lb/MMBtu. That equals seven times the Ozone Season emission in this period. That is a period of 35,000 hours, meaning that the catalyst would have been replaced once or twice, if year round operation were in effect.

Due to the high cost of SCR operation, in 7 of 12 months each year, the total combined 12-month annual $NO_x$ emissions from Jun., 1, 2001 to Sep. 30, 2007, was 90,000 tons. Had the plant operated at 0.3 lb/MMBtu with low-$NO_x$ burners and OFA, the total emissions would have been about the same, 95,000 tons without expenditure of $225 million for the SCR.

$2^{nd}$ Solution-SNCR: The clearly preferred alternate solution would have been to use this inventor's SNCR process, whose basic features were already developed by the late 1990s and known to the plant's operators. While due to a lack of funds, the 0.15 lb/MMBtu output was first demonstrated on the 50 MW coal fired boiler at the end of 2003. However, it could have been demonstrated well before 2000 had the government not rejected several proposals for very low cost tests on several utility boilers. The 0.4 $NO_x$ level from the 1,500 MW boilers would have been reduced to 0.15 lb/MMBtu by increased urea or ammonia injection to yield 63% $NO_x$ reduction, which is feasible because unlike other SNCR processes, it is not limited by ammonia slip limits. This would have reduced $NO_x$ in the 7 year Ozone period to 22,200 tons of $NO_x$ emission at capital costs in the several dollars per kW range. The mol ratio of urea or ammonia to $NO_x$ would be somewhat over double that used for SCR. The combustion gas heat loss from water droplet injection would be offset with added coal injection. To lower $NO_x$ to the 0.08 lb/MMBtu level of SCR, the inventor's patented coal or biomass reburn process could have been used, or alternatively, the difference between SCR and SNCR, 22,200−11,000=11,200 tons of $NO_x$, could have been purchased from $NO_x$ allowance markets for about $33.5 million, a pittance compared to the SCR capital cost over 7 years of $252 million.

Therefore, it would seem that major beneficiaries in the use of SCR to-date have been the SCR equipment manufacturers and installers, and not the ratepayers. Using an average of $150 per kW for the 76,918 MW capacity equipped with SCR, revenue yield was $11.5 billion.

13. Mercury Capture from Coal Combustion a) Zauderer's U.S. Pat. No. 7,247,285, (issued Jul. 29, 2007 (and which is incorporated herein by reference in its entirety), discloses capture of volatile trace metals, especially arsenic and mercury found in coal, by encapsulation in slag droplets formed during coal combustion followed by slag droplet impact on the liquid slag layer lining the wall of an air-cooled cyclone combustor, and draining the slag from the combustor floor prior to re-evolution of the volatile trace metals from the slag into the gas stream.

A second process disclosed in said patent was that the volatile metals that evolved in atomic form from organic matter in coal would be trapped by deposition inside the porous calcium oxide particles or activated carbon particles in the cold post-combustion zone of the boiler or furnace. The porous calcium oxide particles used for this purpose would come from those particles that had not reacted with sulfur dioxide in the nominal 2000° F. gas temperature post-combustion zone.

Earlier in this decade this inventor proposed to the government to test these mercury capture processes in a 20 MMBtu/hour coal fired, boiler, to which the patented air-cooled slagging combustor was attached. The proposal stated that this process had been proven with arsenic and lead. Furthermore, prior test data also showed that the arsenic and lead capture in the slag increased with the ash content of the coal increased. This process is especially attractive in China and India, whose mostly high ash coals emit an incredible 15 to 25 times more mercury into the atmosphere that all U.S. coal fired boilers, with the results that Asia's mercury deposition on U.S. soil exceeds the total U.S. coal plant emissions of about 40 tons.

The government rejected the proposal on the grounds that all the mercury in coal exists as volatile atomic matter, and as such the mercury will rapidly evolve into the combustion gas preventing its capture. Nevertheless, the government acknowledged that the process might work in high ash China coals but that "was not the U.S. government mission."

In 2007 this inventor discovered on EPA and U.S. Geologic Web sites that while the average mercury levels in all U.S. coals does not differ substantially (see FIG. 13) it differs enormously as to its location in the coal structure. In the bituminous coals, which are found and used almost exclusively in the Eastern half of the US, the mercury is found almost exclusively in coal mineral matter, primarily pyrites. Furthermore, there is a strong correlation between the concentration of mercury and arsenic in the ash, in the pyrites (See FIG. 14). Therefore, Zauderer's patent teaches a unique process that could remove much of the mercury in US bituminous coals, and very much more from high ash Asian coals. Furthermore, as disclosed in said patent, the mercury trapped in the slag does not present a massive disposal problem of the solid waste, as is the case with when activated carbon is used to capture mercury.

As was disclosed at a December 2006 government conference on mercury control, the U.S. government has expend in this decade about $70 million apparently almost all of it on testing the Activated Carbon mercury capture process on dozens of coal fired utility boilers. As noted this process is of primary benefit in sub-bituminous coals where part of the mercury is in the organic matter. This inventor's request for testing his mercury process in 2002 was for about $200 thousand dollars.

Furthermore, said patent also disclosed the use of lime or limestone, which form extremely porous particles during very rapid calcination in the post-combustion gas temperature zone where $SO_2$ is captured. In addition, or alternatively, activated carbon can be used to remove the balance of the mercury, especially that part in the atomic state, but at much lower concentrations. The use of calcium oxide for mercury is counterintuitive because the calcination occurs at a much higher gas temperature than that is used for activates carbon capture of mercury. It is emphasized that since the bulk of the other gas pollutants, such as $NO_x$, $SO_2$, HCl, and mercury are removed by other means upstream of the low gas temperature activated carbon injection zone, the quantity of mercury containing activated carbon requiring solid disposal is far less that other processes that rely on this method 14. Reducing $NO_x$ and $CO_2$ Emission with Biomass Reburn In U.S. Pat. No. 6,453,830 dated Sep. 24, 2002, Zauderer disclosed injecting biomass to reduce $NO_x$ by reburning in a post-combustion zone of coal fired boilers. It was disclosed that the use of biomass would also reduce $CO_2$ emissions.

At the time of filing said patent in 2002, $CO_2$ reduction appeared to be in the distant future. However, as disclosed in Section (12) (B) (b) herein, renewable is now a pressing issue after passage of the Energy Bill on Nov. 15, 2007 by the U.S. House of Representatives that requires electric utilities to generate 15% of their electricity by renewables. Although blocked by the Senate, this issue will likely return. Therefore, a means is here disclosed whereby one can rapidly demonstrate the present $NO_x$ biomass process in a coal fired utility boiler by using sawdust as the reburn fuel. One can select a nominal 100 MW boiler operating for 7,000 hours annually, at a 10,000 Btu/kW-hr heat rate. 15% renewable biomass at 18 MMBtu/ton Higher Heating Value, would require a total of about 5,800 tons per year of sawdust, or 160 tons per day, equal to 8 truckloads, which is readily doable at minimal capital expenditure.

15. Slag Control in the Coal Fired Boilers and Furnaces.

Comments on the Fuel Chem and Ecobik slag control processes were stated earlier in this application. The primary conclusion was that insufficient information was disclosed about those processes to enable one skilled in the art to practice their processes and invention with the very great varieties of coal properties. The most puzzling aspect of those processes is that minute concentration of minerals that are injected, are effective in controlling slag deposition.

For example, in one of a series of patents with the same primary inventor of what appears to be the Fuel Chem process, (U.S. Pat. No. 5,740,745, issued Apr. 21, 1998, assigned to Nalco Fuel Tech, Corp.) teaches that for black liquor boilers, magnesium oxides in concentrations of 0.5 to 5 lb per ton of black liquor solids is preferred, which equals from 0.025% to 0.25%. The Ecobik process apparently uses a chrome compound also in apparently similar low concentrations.

In contrast the present invention discloses that slag control requires injecting metal oxides into slagging combustors for slag control at up to tens of percents, as shown in FIG. 7 of this application. These high metal oxide concentrations are necessary to reduce the melting point of the slag-mineral mater for effective slag removal from the combustor. Also, similar concentrations levels are required to increase the slag melting temperature.

However, this inventor has observed over several decades of testing that the ash and slag deposits in the 20 MMBtu/hr oil-design boiler which has very narrow convective tube spacing and to which the air-cooled slagging combustor is attached had no slag deposits forming on said tubes and boiler refractory wall. Instead dry powdery ash deposits formed that was readily removed by compressed air blowing.

It is disclosed that the explanation of the lack of ash or slag adherence in said boiler can also apply to other boilers. It is accomplished by injecting minimal amounts of metal oxide particles that deposit and adhere to surfaces of ash or slag particles and form a structurally weak interface between adjacent ash or slag particles. Consequently they are readily separated and fall off vertical boiler or furnace surfaces or can be readily removed with air or steam blowing. That procedure does not require significant additives. In fact, the ash that deposited on the water tubes in the refractory surface and metal surfaces of the 20 MMBtu/hr boiler was readily removed with short minute-long bursts of compressed air. In effect a very small fraction of the limestone that was used for slag control in the slagging combustor that was 10 microns or less in diameter was blown out of the combustor into the boiler. It was these small particles that attached to the ash particles and that were readily removed from the boiler walls with compressed air blowing. This effect was even more pronounced with lime, whose nominal 10-micron mean diameter particles were mostly blown out of the combustor. Therefore, the $SO_2$ control process disclosed in Zauderer's patents should also control slag and ash deposition in coal fired boilers.

However, in sub-bituminous coals, which have high calcium and magnesium concentrations that depress the ash slagging temperatures, other metal oxides must be used as disclosed above in this invention to limit deposition and wall attachment of liquid slag. In that case, the metal oxides must be selected to adhere to the ash but not melt and fuse into the ash. For proper selection of metal oxides, phase diagrams, similar to FIG. 7, as are found for many different ash components in the volumes published by the American Ceramic Society, should be used.

16. Post-Combustion $SO_2$ Removal with Lime or Limestone Slurry Injection

The removal of sulfur dioxide, $SO_2$, by lime or limestone particles inside aqueous air-atomized droplets injected in the post-combustion gas zone of coal fired boilers in the temperature range of about 1800° F. to 2100° F. is disclosed in Zauderer's U.S. Pat. No. 6,722,295, issued Apr. 20, 2004. Said droplets also contain either urea or ammonia for $NO_x$ reduction. The gas temperature range at which the calcined lime or limestone particle reaction with $SO_2$— is optimum is very narrow. The same consideration applies for the urea or ammonia reaction with $NO_x$. One set of test evidence of this combustion temperature effect is disclosed in FIGS. 3 and 4 of Zauderer's non-provisional application publication No. 20070180351, Ser. No. 11/668,929, filed Jan. 30, 2007, (which is incorporated by reference in its entirety herein) for $NO_x$. FIG. 8 in said application shows a similar effect for the calcined lime (CaO) with $SO_2$ reaction.

However, while urea and ammonia are very soluble in water, limestone has no solubility while lime has extremely limited solubility. As a result, they are dispersed in water as slurries. This is not a problem with insoluble limestone, which can be processed to an excess of 50% concentration in water. On the other hand, lime concentrations must be limited to less than 30%, and preferably to 25%, or less to prevent solidification of the mixture.

Another important consideration, as disclosed in said inventions, is to control the gas temperature at which the reaction is effective and optimum, which is accomplished by adjusting the total water flow rate. This water flow control method was used at full load in the 50 MW power, where the measured gas temperature in said reagents injection zone was about 2400° F., while at 22 MW it was about 1800° F. At the latter temperature both the $SO_2$ and $NO_x$ reactions are near optimum. However, a problem occurred with lime injection because the injectors used in said tests, Spraying Systems Model 1/2-SU85, which produces a flat fan spray perpendicular to the gas flow direction, was not capable of producing the water flow rate needed to cool the combustion gases to the 1800° F. for optimum $SO_2$ reduction, while simultaneously achieving enough lime flow to obtain the desired calcium-sulfur mol ratio, Ca/S, of 2 to 3 that was necessary to reduce $SO_2$ by 50% or more at full 50 MW load.

To correct this flow deficiency it is now disclosed that one must use higher fluid capacity fluid injector heads, such as Spraying Systems Model 1J-SU-155, whose total flow capacity at 60 psi air and water is 600 gallons per hour, gph. This compares to 222 gph at 54 psi air and 55 psi water of inadequate capacity by the ½-J-SU85 model. These injectors are only indicative on how to practice this invention according to the specifications disclosed in said inventions. Other spray nozzles can be used if they achieve the key requirements of these invention for $SO_2$ and $NO_x$ control, namely injection at the outer edge of the gas temperature zone where the reactions are effective, and intersecting most or all the cross-section of the gas flow being treated, and sufficient reagents flow to implemented the desired reactions, and in a design capable of surviving at the combustion gas temperatures with proper cooling.

17. Advantages of this Invention's $SO_2$ Reduction Process Versus Flue Gas De-Sulfurization Processes (FGD)

As with Zauderer's $NO_x$ combustion and post-combustion reduction processes, a major advantage of Zauderer's $SO_2$ reduction processes is their minimal capital cost compared to the various very costly wet and dry flue gas de-sulfurization (FGD) processes. As discussed earlier in this application, EIA/DOE report that FGD system costs increased from $126/kW in 1996 to $141/kW in 2006. However, the actual cost is substantially higher. A FDG system is currently being installed at the 1,500 MW power plant with the SCR system, described in Section 12 above, at a cost of $400/kW. The uncontrolled emissions have been 2.7 lb/MMBtu over the past decade. A similar size Bituminous coal fired nominal 1,000 MW power plant, also with two boilers, is installing a FGD system for the same price, $400/kW. Another Western power plant rated at 1,500 MW with two boilers, but burning a low-sulfur Bituminous coal, emitting only 0.8 lb/MMBtu received quotations of $800 million, ($533/kW), for both FDG and SCR, again with most of the cost for the FGD system. This is a major disadvantage of both technologies, namely the capital cost primarily depends on the quantity of gas being processed. Therefore, high and low sulfur FGD systems must have similar capital costs. The different levels of limestone, lime, urea, ammonia costs are expensed in the consumables.

The November 2007 issue of Power Engineering Magazine discusses the FDG costs escalation, and attributed the high cost to high material costs and labor costs. However, that is simply an add on to what are inherently high cost processes that depend on total gas flow, with the $SO_2$ level being a secondary cost factor. In recent years in order to recover at least part of these capital expenditures, forced oxidations (LSFO) with limestone are being installed. Here excess air oxidizes the calcium sulfites, allowing its conversion to gypsum. It is sold almost entirely for wallboard manufacture, which accounts for about one-third of the U.S. gypsum supply for wallboard, (reported in another article in said November 2007 issue).

Wallboard was probably profitable due to the recent housing boom. However, with the collapse of housing in 2007, the wallboard market for the estimated doubling of gypsum capacity from power plants that have ordered, about 100,000 MW of FGD capacity, looks problematic. The new FGD construction on order will double the current installed FDG capacity, compared to an increase of only 18% since 1996. Furthermore, as briefly noted in said Power Engineering article, but detailed in the Wall Street Journal on Dec. 11, 2007, decomposition of wallboard in oxygen deficient construction dumps releases hydrogen sulfide ("rotten egg") which is a toxic gas that EPA may declare a hazardous substance. This would result in a future adverse impact on FGD derived gypsum sales.

In contrast to FGD, Zauderer's U.S. Pat. No. 6,722,295, (issued Apr. 20, 2004, with references to prior work), disclosed two $SO_2$ reduction processes.

The first $SO_2$ removal process takes place in the primary combustion zone of an air-cooled slagging combustor. Limestone is co-injected with pulverized coal, and calcined by the combustion gases in the combustor to react with $SO_2$ to form calcium sulfates or sulfites. The reacted particles impact and are dissolved into the liquid slag layer lining the combustor wall. The slag is drained and quenched in water before the sulfur can re-evolve into the gas stream. This encapsulates the sulfur in the solidified slag and renders it chemically inert. To practice this process in existing boilers requires replacing the existing coal burners with the slagging air-cooled combustors.

The second $SO_2$ reduction process occurs in the post combustion zone in the furnace section of a boiler, is described in said patent and additionally herein in Section 16, as well as in Zauderer's related patents and patent applications. Specifically, lime or limestone is injected in this zone in the 2000° F. gas temperature range. It is now disclosed that this $SO_2$ reduction process results in formation of oxidized $CaSO_4$, gypsum, which eliminates the costly forced oxidation step and dewatering steps needed in FGD systems to produce gypsum.

Also, due to the drastically lower cost of this post-combustion process, there is no need to sell the gypsum for wallboard use to reduce operating costs, although that option is available.

There is, however, an even more potentially attractive option herein disclosed, namely to improve $SO_2$ capture by increasing the injected calcium over sulfur mol ratio from a nominal 2 to 3 to higher if warranted. The excess injected limestone, collected in ESP or baghouse, is used for $CO_2$ sequestration, as disclosed in the next Section 18. While this method can be practiced in conventional existing pulverized coal-fired boilers, it is even more attractive for boilers and furnaces retrofitted with the air-cooled slagging combustor.

The reason is that these combustors remove about 75% of the coal ash, thereby greatly reducing the ash content of the disclosed limestone conversion to calcium bicarbonate process for $CO_2$ sequestration.

To demonstrate for calculation purposes, assume that a 2% sulfur with 10% ash coal is subjected to limestone injection at a Ca/S mol ratio of 3, and one-third of the calcined limestone reacts with 100% of the $SO_2$ to form $CaSO_4$, and the balance of CaO reacts with $CO_2$ to limestone. The resultant particulate mixture, based on a percent of original coal, would consists 8.5% CaSO4, 2.5% coal ash, and 12.5% limestone. The limestone would then be used to form calcium bicarbonate by removing 5.5% of the $CO_2$ gas stream and dissolving it in water at high pressure. If one were to recover the sulfur from the gypsum, then 8.25% of the $CO_2$ in the combustion gas exhaust could be removed. Zauderer's U.S. Pat. No. 7,282, 189 discloses removing all the volatile matter from the coal and converting it to hydrogen, and burning the remaining char in the slagging combustor and then recovering all the $CO_2$. However, in the currently disclosed method, using a bituminous coal with a nominal 50% fixed carbon, 11% (i.e. 5.5/ 50%) to 16.5% (i.e. 8.25/50%) of the $CO_2$ would be removed as calcium bi-carbonate. Of course more pulverized limestone could be used to further increase $CO_2$ removal. However, the present calculation is to show the co-benefit of removing $SO_2$.

This then demonstrates the major advantage offered by this method of treating $SO_2$ removal. FGD typically reduce $SO_2$ by 90% to 95%, and with forced oxidation 98% are achieved. However, the EPA Clean Air Act CAIR Standard scheduled to take effect in 2010 requires a 50% reduction in U.S. $SO_2$ emissions to 5 million tons per year from 10 million tons per year in 2007, a level where it has been stuck since beginning of the decade. Since only about one-third of U.S. coal power capacity is equipped with FGD and assuming the 100,000 MW additional FGD installations occur by about 2010, the 5 million ton target should be met. However, these projections are suspect. According to DOE about two-thirds of coal power plants are less than 300 MW in capacity, and they are too small to justify the enormous expenditures for SCR and FGD. This means that unless something gives, there will be substantial coal fired capacity shutdown. This pressure will further increase with the mercury standard scheduled to take effect also in 2010.

On the other hand, Zauderer's $SO_2$ post-combustion method has demonstrated 80% reduction in the 20 MMBtu/hr coal fired boiler. Also, very limited testing with the smaller Spraying System 1/2J injectors on the 50% power plant yielded 50% $SO_2$ reduction if the Ca/S mol ratio is increased to 2.0 from 0.7 in the test that yielded about 18% reduction. Therefore, with the larger injectors disclosed in the present invention, coal power plants could meet the 2010 50% reduction, at least, and with $CO_2$ reduction co-benefit, as explained next, and for mercury as explained herein and in Zauderer's U.S. Pat. No. 7,247,285.

18: $CO_2$ Sequestration

Zauderer's invention (U.S. Pat. No. 7,282,189, granted Oct. 16, 2007) discloses in detail methods that can be utilized to reduce and eliminate $CO_2$ emissions.

In the one method that can be implemented immediately on all coal fired boilers, $CO_2$ is removed by operating the boilers under very fuel rich conditions to produce about 20% unburned carbon, which is collected and stored for future use when economic means for $CO_2$ capture sequestration are developed. This also immediately reduces $NO_x$, whose credits can be sold, as well as $CO_2$, whose credits may soon been sold. The lost energy from the unburned carbon is replaced by adding either biomass or by hydrogen content from volatile matter in coal, or oil or natural gas.

The other method disclosed in said patent is a preferred method of pyrolyzing the volatile matter in the coal, and convert it to hydrogen, where it can be uses as a fuel at the power plant, or as a transportation fuel, or as a chemical feedstock. The remaining coal consisting of carbon char and ash derived from the coal's fixed carbon, is burned in air cooled slagging combustors that are retrofitted to existing coal fired boilers, or installed on new boilers. The pollutants, $SO_2$, $NO_x$, volatile trace metals are all removed, as per the methods disclosed in Zauderer's patents, non-provisional and provisional applications, including as disclosed herein. The remaining combustion gases consisting of $CO_2$ and $N_2$ are collected in the boiler exhaust ducting cooled to ambient conditions and dispersed in water, which is compressed to a pressure sufficient to pump the $CO_2$-water solution to a depth in the earth at which reaction with underground limestone will result in calcium bicarbonate. Prior to pumping of the $CO_2$—$N_2$-water mixture, the compressed nitrogen's energy is recovered by expansion in turbines, that is feasible due to the about 60 times greater solubility of $CO_2$ over $N_2$ in water.

One reason that said $CO_2$ patent is cited herein is to differentiate practicing that invention, which focuses on maximum use of existing power plant systems that minimizes capital costs, as opposed to the approach pursued by the government of erecting and testing a totally new power plant technology for $CO_2$ separation and sequestration, called "Future Gen." Specification on this plant began in 2003, yet its site was not selected until December 2007. Startup is scheduled for 2012. This means that assuming the technology is successful it would be a few decades before its wide use. The government approach of developing complex and costly systems is in keeping with the methods it used for $SO_2$, $NO_x$, and mercury control processes, as discussed above.

However, the primary reason for this discussion is to disclose improvements in $CO_2$ control than can be practiced within the core elements of said $CO_2$ patent, which are the generation of hydrogen from volatile matter in coal and use the remaining char as the boiler fuel whose $CO_2$ output is separated and sequestered. This yields $CO_2$ concentrations of about 20% partial pressure in the $CO_2$—$N_2$ exhaust from the boiler, which is about double $CO_2$ emissions from conventional power plants, and reduces the energy needed to separate and sequester $CO_2$.

Said patent also teaches the use of limestone formations that represent about 2% of the Earth's crust as the depository and chemical agent for permanent sequestration of $CO_2$ as calcium bicarbonate. The suitability of in ground limestone formations for $CO_2$ capture as calcium bicarbonate was assumed based on its existence in nature. However, recent published government sponsored geological research throughout the U.S. has validated this assumption. One such study was reported on Jan. 24, 2006 by URS Corp. (Job. No. 28066931) for the owners of the Mohave Generating Station, Laughlin, Nev. The report reveals that there are considerable porous limestone formations in the many locations in the Country suitable for this purpose. This porosity is of special benefit because it enables penetration of the water-$CO_2$ solution into the limestone structure. Other recent studies sponsored by the federal government have identified many suitable sites in the US for mineral sequestration. These are in addition other sites, such as depleted oil wells, abandoned coal mines, rock shale formations, etc. meaning that they also exist in other areas of the World. This, therefore, confirms the sequestration potential disclosed in said patent.

Another point now disclosed is that there other means by which $CO_2$ can be separated and sequestered with limestone as a calcium bicarbonate, as described in said invention. The important element of said invention is that entire process from raw coal to the emission of $CO_2$ and its separation and capture provides major process and cost advantages over other $CO_2$ separation and sequestration delivery methods. However, other $CO_2$ separation and sequestration process can also be applied within the framework of Zauderer's $CO_2$ invention. One such process is disclosed by D. Golomb and A. Angelopoulos, et. al. called "Benign $CO_2$ Sequestration in the Ocean" (5th International Conference on Greenhouse Gas Control Technologies") The authors disclosed forming a high pressure emulsion of liquid $CO_2$ with water and limestone and pumping it from power plants through pipes offshore that terminate 500 to 1000 m. under the Ocean's surface where the emulsion will release and sink into the Ocean floor as permanently sequestered calcium bicarbonate. However, an alternative based on Zauderer's $CO_2$ patent, may only require pumping the water-liquid $CO_2$ emulsion underground to limestone formations to form calcium bicarbonate. Use of underground limestone formation near power plants will substantially reduce the major cost of extracting and pulverizing the limestone as proposed by said two authors.

In addition, there is another means now disclosed for sharply reducing the cost by bringing limestone to a power plant for the sole purpose of creating the liquid $CO_2$-water-pulverized limestone emulsions. This limestone would be in addition to the limestone or lime that will be used to remove $SO_2$ in the post-combustion zone of a coal fired boiler. The excess limestone left from the $SO_2$ capture process would be used as disclosed at the end of the previous Section 17 to prepare the $CO_2$-water-limestone emulsions. In addition, or alternatively, the process described in Zauderer's $CO_2$ patent can be used for part of the $CO_2$ removal process. The specific method or methods used will be selected to minimize capital and operating costs. The major advantage of these different approaches is that none of them require massive investment dedicated to each approach. Instead all the methods disclosed, including even biomass reburn, are to be integrated to yield the lowest cost means for achieving zero emissions from coal combustion.

While the invention has been described in terms of certain exemplary embodiments, those skilled in the art will recognize that the invention can be practiced with modifications within the spirit and scope of the appended claims.

What is claimed is:

1. A method whereby slag formed from solid fuel ashes during combustion in boilers or furnaces is suppressed by introducing additional air in a post-primary combustion zone to lower the combustion gas temperatures below temperatures at which the ash softens or liquefies and adheres to boiler or furnace surfaces.

2. The method in accordance with claim 1, wherein the slag formation is suppressed with metal oxides particles, including at least one of calcium, magnesium, iron, chrome oxides, that are injected in dry or slurry form, and in quantities that increase fuel ash softening and melting temperatures above the gas temperatures wherein the ash particles are entrained.

3. The method in accordance with claim 2, wherein the metal oxides also control gas emissions, including at least one of $NO_x$, $SO_2$, $CO_2$, and trace metals including at least one of arsenic, lead and mercury.

4. A method in accordance with claim 3, wherein a selection of the metal oxides is determined from temperature and composition phase diagrams based on combined chemical compositions of metal oxide additives and the fuel ash.

5. A method in accordance with claim 4 to suppress the deposition and adhesion of ash or slag particles on a boiler or furnace by injecting quantities of metal oxides that are less that the quantities required to impact chemical properties of fuel ash as determined from the solid phase diagrams of the ash and the ash control additives but sufficient to deposit as solids on to the surface of fuel ash particles that operate in boiler or furnace gas temperature zones high enough to soften and melt the ash particles but not high enough to soften or melt the solid additives, which are injected at concentration that can be as low as one percent, thereby rendering the fuel ash friable and sharply reducing or even eliminating ash or slag deposition on furnace or boiler surfaces.

6. The method in accordance with claim 1, wherein, for use in high ash coals, greater than 10%, fluxing agents including limestone are used in air-cooled, slagging combustors to remove up to about 80% of coal ash as liquid slag, while a balance of ash exiting a combustor is treated as in claim 1 to suppress ash deposition on the boiler or furnace to which the combustor is attached.

7. The method in accordance with claim 1, wherein, for use in coals with about 5% of less ash, a conventional pulverized coal burner is used for the boilers and furnaces.

8. A method comprising fueling a coal fired power plant fueled by a coal-water slurry pipeline, wherein an air-cooled slagging combustor replaces coal burners to achieve efficient combustion, and exhaust combustion gases are cooled with water droplets sprays to about 150° F. in order to condense and recover a bulk of the slurry water.

9. A method comprising a final combined level of reduction of nitrogen oxides, ($NO_x$), at an exhaust stack by reducing fuel rich operation of low-$NO_x$ burners in a primary combustion zone of coal fired boilers or furnaces followed by reducing in a post-combustion zone final combustion air and followed by removing Selective Catalytic Reduction (SCR) system, and in its place reducing a resultant increased $NO_x$ emissions in the post combustion zone by a Selective Non-Catalytic Reduction (SNCR) process that has no adverse impact on ammonia slip, and adding reburn with biomass to duplicate $NO_x$ emissions achievable with an original operation of the low $NO_x$ burners and the SCR.

10. The method in accordance with claim 9, wherein any additional $NO_x$ emission reduction is accomplished by purchase of $NO_x$ emission allowances.

11. The method in accordance with claim 9, wherein the SNCR process comprises inserting multiple flat plane air atomized droplets of aqueous solutions of urea or ammonia at an edge of an entire boiler or furnace post-combustion gas cross-section wherein the $NO_x$ reducing reaction is effective 12. The method in accordance with claim 11, wherein diluting water flow for urea or ammonia is increased as needed to lower combustion gas temperature to a range at which $NO_x$ reduction is optimum, between 1800° F. and 2000° F., and wherein power lost by the gas cooling is replaced by increasing coal flow.

13. The method in accordance with claim 9, wherein a degree of $NO_x$ reduction by low $NO_x$ burners is reduced to enable firing of low volatile, low sulfur coals to reduce sulfur dioxide emissions, $SO_2$, without any significant loss of unburned carbon in boiler or furnace exhaust.

14. The method in accordance with claim 9, wherein mass flow of biomass utilized for reburn is increased to reduce non-renewable flow of carbon dioxide, $CO_2$, exiting to atmosphere by about 15% or more from levels achieved with 100% coal combustion.

15. The method in accordance with claim 9, further comprising operating coal fired boilers and furnaces to minimize emission and minimize capital and operating costs.

16. A method whereby coals, primarily bituminous coals that have most or all of their mercury in pyrites in concentrations related to arsenic content in the pyrites, have the mercury removed by utilizing air-cooled slagging combustors and impacting the mercury containing coal slag particles in a slag layer lining a wall of a combustor and draining and water quenching the slag from the combustor within about 3 to prevent the mercury trapped in the slag from re-evolving from the slag as a gas into the combustion gases.

17. A method for controlling in boilers or furnaces slag and ash depositions on refractory and metal walls exposed to ash and slag laden particles from coal combustion by co-injecting with coal in a primary combustion zone or in an immediate post-combustion zone metal oxide particles in concentration of less than 1% of total coal feed for attaching to a surface of coal ash or slag particles, thereby inhibiting adherence to each other and to the metal walls.

18. The method in accordance with claim 17, wherein metal oxide additives are selected from phase diagrams of coal ash and injected metal oxide mixtures which have liquefaction temperatures that are higher than liquefaction temperatures of the coal ash.

19. The method in accordance with claim 18, wherein the metal oxides particles in a 10 micron range are dispersed in air atomized, aqueous droplets of varying diameters throughout combustion gases in the primary combustion zone and post-combustion at gas temperatures above about 2000° F.

20. A method whereby lime particles, nominally of about 9 microns in diameter are dispersed in water at concentrations up to 30% by weight and injected as air atomized droplets to intercept post-combustion gas flows in a temperature range of 1800° F. to 2400° F., utilizing injectors with capacities to disperse aqueous lime mixtures at up to a mol ratio of calcium oxide to sulfur dioxide of three (3), and sufficient water flow capacity to cool a combustion gas zone being treated to gas temperatures at which $CaO$—$SO_2$ capture reaction is maximum, being about 1800° F., with additional coal being fed through primary burners to recover energy lost in cooling the combustion gases to said temperature range.

21. The method in accordance with claim 20, wherein limestone of essentially identical particle size replaces lime, and a concentration of the limestone is increased by use of stabilizers and surfactants to increase the limestone concentration in water to up to nominally 50%.

22. The method in accordance with claim 21, wherein, if lime or limestone is used excess limestone recovered in particulate collection systems of a boiler or furnace is to be used to form emulsions comprising liquid carbon dioxide, water and the limestone to form calcium bi-carbonate for sequestration underground or in Oceans at depth sufficient to prevent release of carbon dioxide as gas.

23. The method in accordance with claim 22, wherein the emulsions are augmented with finely pulverized limestone to further increase a quantity of carbon dioxide reacted to form the calcium bi-carbonate.

24. The method in accordance with claim 23, wherein air-cooled slagging combustors are utilized as primary coal combustors for boilers or furnaces to remove about 75% of coal ash as slag and thereby increase a ratio of the limestone to coal ash or, if necessary, simplify removal of the coal ash prior to preparation of the water-carbon dioxide-limestone emulsion.

25. The method in accordance with claim 20, wherein the $CaO$—$SO_2$ reaction replaces flue gas desulfurization processes.

26. The method in accordance with claim 24, wherein emulsion preparation is utilized to augment removal and sequestration of $CO_2$ by compression of nitrogen-carbon dioxide exhaust gases followed by dispersal in water and removal of the compressed nitrogen by expansion in a gas turbine and pumping high pressure carbon dioxide-water solution into underground limestone formations to form calcium bi-carbonate.

27. The method in accordance with claim 21, wherein the lime or limestone is used for $SO_2$ capture, and porous calcined calcium oxide particles that are not reacted with $SO_2$, react with atomic and molecular mercury and other trace metal including arsenic for removal from the combustion gases in the downstream sections of a boiler or furnace that are at severl 100 degrees Fahrenheit.

28. The method in accordance with claim 20, wherein any additional $SO_2$ emission is accomplished by purchase of $SO_2$ emission allowances.

29. The method in accordance with claim 20, further comprising operating coal fired boilers and furnaces to minimize emission and minimize capital and operating costs.

* * * * *